(12) United States Patent
Takahashi

(10) Patent No.: US 10,313,444 B2
(45) Date of Patent: Jun. 4, 2019

(54) HOME INTERIOR MONITORING SYSTEM AND COMMUNICATION SETTING METHOD

(71) Applicant: Panasonic Intellectual Property Management Co., Ltd., Osaka (JP)

(72) Inventor: Takeshi Takahashi, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 235 days.

(21) Appl. No.: 15/449,717

(22) Filed: Mar. 3, 2017

(65) Prior Publication Data

US 2017/0279628 A1 Sep. 28, 2017

(30) Foreign Application Priority Data

Mar. 24, 2016 (JP) .................... 2016-060969
Mar. 24, 2016 (JP) .................... 2016-060972

(51) Int. Cl.
*H04L 29/08* (2006.01)
*H04L 12/403* (2006.01)

(52) U.S. Cl.
CPC ........... *H04L 67/12* (2013.01); *H04L 12/403* (2013.01)

(58) Field of Classification Search
CPC ............................. H04L 67/12; H04L 12/403
USPC ........................................................ 709/227
See application file for complete search history.

(56) References Cited

U.S. PATENT DOCUMENTS

| | | | |
|---|---|---|---|
| 9,479,354 B2 | 10/2016 | Yamanishi et al. | |
| 2002/0154644 A1* | 10/2002 | Lindemann | H04L 12/4612 370/401 |
| 2002/0176366 A1 | 11/2002 | Ayyagari et al. | |
| 2007/0130296 A1 | 6/2007 | Kim | |
| 2007/0191035 A1* | 8/2007 | Huggett | H04W 4/12 455/466 |
| 2013/0265935 A1 | 10/2013 | Matsuda | |

(Continued)

FOREIGN PATENT DOCUMENTS

| | | |
|---|---|---|
| JP | 2002-344458 A | 11/2002 |
| JP | 2013-162323 A | 8/2013 |

(Continued)

*Primary Examiner* — Wing F Chan
*Assistant Examiner* — Leon Y Tseng
(74) *Attorney, Agent, or Firm* — Seed IP Law Group LLP

(57) ABSTRACT

In a case of a connection destination of a master device in wireless communication not being registered in the master device, a smartphone, at the start of setting of the registration, determines a mode of wireless communication with the master device (specifically, a router connection mode or a soft AP mode) according to whether or not wireless communication is performed through a wireless router and acquires setting information related to the connection destination corresponding to the determined mode of wireless communication. The smartphone sends a message indicating that wireless communication will be performed in the determined mode of wireless communication and sends the setting information related to the connection destination corresponding to the mode of wireless communication to the master device. The master device registers the setting information that is sent from the smartphone and related to the connection destination corresponding to the mode of wireless communication.

10 Claims, 30 Drawing Sheets

(56) References Cited

U.S. PATENT DOCUMENTS

2016/0149722 A1     5/2016  Yamanishi et al.
2016/0262095 A1*    9/2016  Sakamoto ............. H04W 48/18
2016/0345367 A1    11/2016  Nakayama
2017/0013184 A1     1/2017  Yamanishi et al.
2017/0359755 A1*   12/2017  Kurz ................... H04L 12/5692

FOREIGN PATENT DOCUMENTS

| | | |
|---|---|---|
| JP | 2013-219430 A | 10/2013 |
| JP | 2014-195215 A | 10/2014 |
| JP | 2016-015681 A | 1/2016 |
| JP | 5845453 B1 | 1/2016 |
| WO | 2015/159588 A1 | 10/2015 |

* cited by examiner

HOME INTERIOR MONITORING SYSTEM AND COMMUNICATION SETTING METHOD

BACKGROUND

1. Technical Field

The present disclosure relates to a home interior monitoring system including a master device of a fixed phone connected to a fixed phone network and a smartphone carried and used by a user in the interior of a home, and a communication setting method between the master device and the smartphone.

2. Description of the Related Art

In recent years, there has been known a monitoring camera system (for example, refer to Japanese Patent No. 5845453) that includes a monitoring camera, a master device of a fixed phone that is connected to a fixed phone network and can communicate with another fixed phone, and a smartphone that can wirelessly communicate with the master device through a wireless router and wirelessly connects with another mobile phone through a mobile phone network (for example, 3G or 4G).

In the monitoring camera system of Japanese Patent No. 5845453, the smartphone, in the case of a wireless router not being registered in the master device, displays a screen prompting a predetermined operation to be performed on the master device and waits for a signal from the master device. The master device directly and wirelessly connects with the smartphone by the predetermined operation and sends a setting request signal to the smartphone. The smartphone, when receiving the setting request signal, wirelessly connects with a wireless router to acquire router setting information from the wireless router and wirelessly connects with the master device to send the router setting information to the master device. The master device registers the wireless router based on the router setting information. Accordingly, when an instruction operation that causes, for example, the smartphone to display an image is performed, the master device receives information as to the instruction operation from the smartphone through the wireless router and can send image data transferred from the monitoring camera to the smartphone through the wireless router.

In Japanese Patent No. 5845453, disclosed is the master device directly communicating with the smartphone in the case of a wireless router not being registered in the master device, by temporarily using the master device as an access point of a wireless local area network (LAN) in order to register a wireless router in the master device.

However, the configuration of Japanese Patent No. 5845453 assumes that after a wireless router is actually registered in the master device, data (for example, the image data from the monitoring camera) is sent and received between the master device and the smartphone through the wireless router. Thus, after the image data from the monitoring camera is transferred to the master device, the master device can transfer the image data to the smartphone through the wireless router, but the master device cannot directly communicate with the smartphone and transfer the image data. In other words, when a wireless router is registered in the master device in the monitoring camera system of Japanese Patent No. 5845453, data cannot be sent and received between the master device and the smartphone without the wireless router in actual operation, thereby posing the problem of low convenience.

SUMMARY

In order to resolve the above problem in the related art, an object of the present disclosure is to provide a home interior monitoring system and a communication setting method that easily perform initial setting of communication between a master device and a smartphone according to a wireless connection status of the smartphone at the time of initial setting of communication between the master device and the smartphone regardless of the presence of a wireless router in wireless communication between the master device of a fixed phone and the smartphone carried by the user, and that thereby improve convenience of the user.

According to an aspect of the present disclosure, there is provided a home interior monitoring system including a master device that can wirelessly communicate with at least one electric device installed in an interior of a home, and a mobile phone terminal that can wirelessly communicate with the master device through a wireless router and that can wirelessly communicate directly with the master device, in which in a case of a connection destination of the master device in wireless communication not being registered in the master device, the mobile phone terminal, at the start of setting of the registration, determines a mode of wireless communication with the master device according to whether or not wireless communication is performed through the wireless router and acquires setting information related to the connection destination corresponding to the determined mode of wireless communication, the mobile phone terminal sends a message indicating that wireless communication will be performed in the determined mode of wireless communication and sends the setting information related to the connection destination corresponding to the mode of wireless communication to the master device, and the master device registers the setting information that is sent from the mobile phone terminal and related to the connection destination corresponding to the mode of wireless communication.

According to another aspect of the present disclosure, there is provided a communication setting method in a home interior monitoring system including a master device that can wirelessly communicate with at least one electric device installed in an interior of a home, and a mobile phone terminal that can wirelessly communicate with the master device through a wireless router and that can wirelessly communicate directly with the master device, in which in a case of a connection destination of the master device in wireless communication not being registered in the master device, the mobile phone terminal, at the start of setting of the registration, determines a mode of wireless communication with the master device according to whether or not wireless communication is performed through the wireless router, the mobile phone terminal sends, to the master device, a message indicating that wireless communication will be performed in the determined mode of wireless communication, the mobile phone terminal acquires setting information related to the connection destination corresponding to the determined mode of wireless communication and sends the setting information to the master device, and the master device registers the setting information that is sent from the mobile phone terminal and related to the connection destination corresponding to the mode of wireless communication.

According to the present disclosure, initial setting of communication between a master device and a smartphone can be easily performed according to a wireless connection status of the smartphone at the time of initial setting of communication between the master device and the smartphone regardless of the presence of a wireless router in wireless communication between the master device of a fixed phone and the smartphone carried by a user, and convenience of the user can be improved.

DETAILED DESCRIPTION

Figure 1:
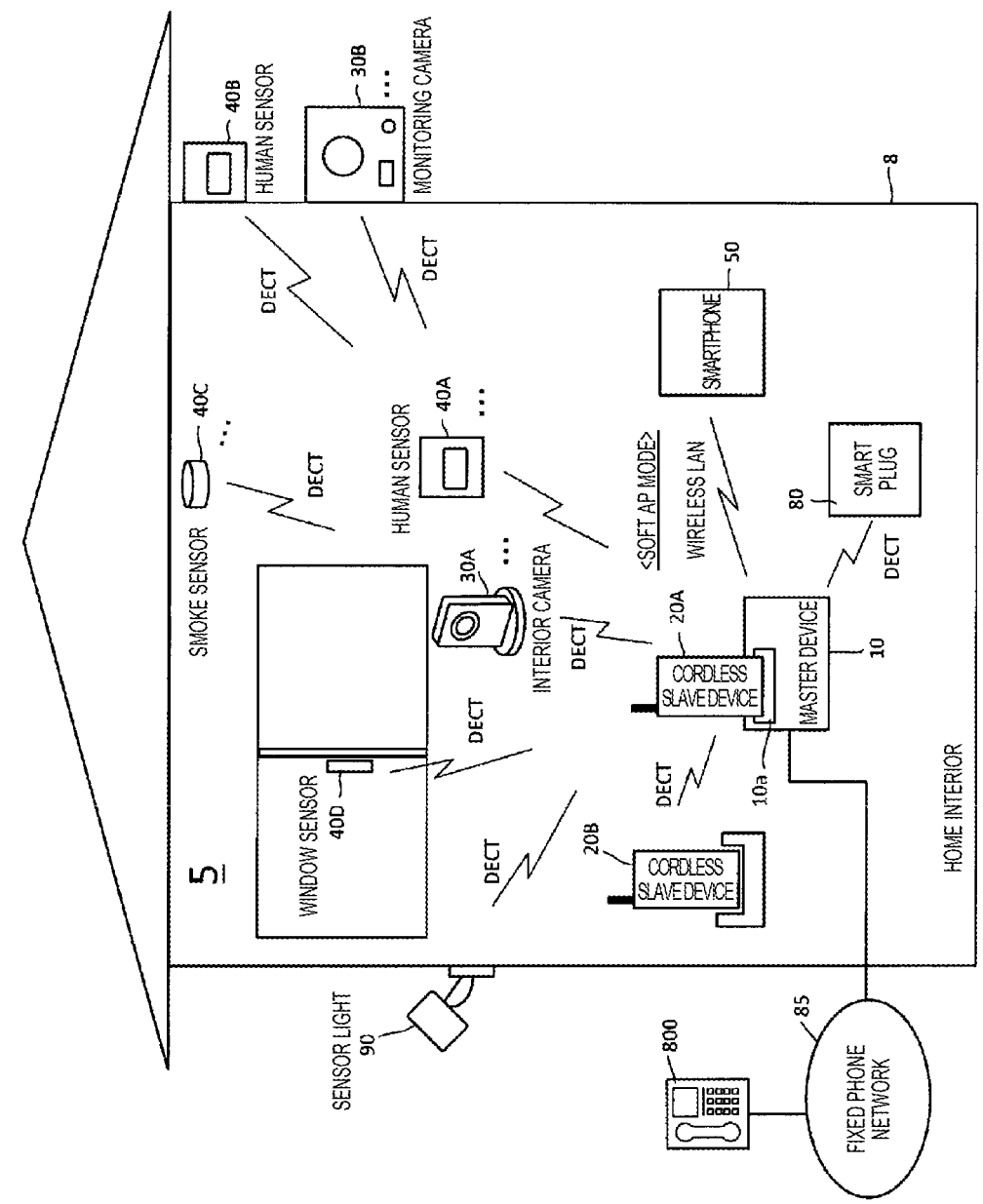
FIG. 1 is a diagram illustrating one example of a system configuration of a home interior monitoring system of each exemplary embodiment in a state where a master device and a smartphone are connected in a soft AP mode.

Hereinafter, each exemplary embodiment in which a home interior monitoring system according to the present disclosure is specifically disclosed will be described in detail with appropriate reference to the drawings. Unnecessarily detailed description may be omitted. For example, detailed description of a previously well-known matter or duplicate description of substantially the same configuration may be omitted. This is to avoid the following description becoming unnecessarily redundant and to facilitate understanding for those skilled in the art. The appended drawings and the following description are provided in order for those skilled in the art to sufficiently understand the present disclosure and are not intended to limit the subject matter disclosed in the claims.

The present disclosure is not limited to the home interior monitoring system and can also be represented as a communication setting method related to communication between a master device and a smartphone in the home interior monitoring system and can also be defined as a device category of the master device or the smartphone included in the home interior monitoring system.

DEFINITION OF TERMS

In each exemplary embodiment below, a mode of wireless communication in which the smartphone constituting the home interior monitoring system, when wirelessly communicating with the master device of a fixed phone constituting the home interior monitoring system, wirelessly connects and wirelessly communicates with the master device through a wireless router is referred to as a "router connection mode". Similarly, a mode of wireless communication in which the smartphone, when wirelessly communicating with the master device of the fixed phone, wirelessly connects and wirelessly communicates with the master device as an access point of a wireless local area network (LAN) is referred to as a "soft AP mode". The soft AP mode can directly connect the master device and the smartphone and thus is also referred to as a direct connection mode. A human being who resides in a home where the home interior monitoring system is installed is referred to as a "user" for convenience.

The home interior monitoring system of each exemplary embodiment below is not limited to being installed in a private home and may also be installed in a commercial facility such as an office, a factory, or a store or in a public facility such as a city hall or a library. In this case, any human being who works in each facility may be a user.

Background of First Exemplary Embodiment

In above Japanese Patent No. 5845453, disclosed is the master device directly communicating with the smartphone in the case of a wireless router not being registered in the master device, by temporarily using the master device as an access point of a wireless local area network (LAN) in order to register a wireless router in the master device.

However, the configuration of Japanese Patent No. 5845453 assumes that after a wireless router is actually registered in the master device, data (for example, the image data from the monitoring camera) is sent and received between the master device and the smartphone through the wireless router. Thus, after the image data from the monitoring camera is transferred to the master device, the master device can transfer the image data to the smartphone through the wireless router, but the master device cannot directly communicate with the smartphone and transfer the image data. In other words, when a wireless router is registered in the master device in the monitoring camera system of Japanese Patent No. 5845453, data cannot be sent and received between the master device and the smartphone without the wireless router in actual operation, thereby posing the problem of low convenience.

Therefore, in the first exemplary embodiment, described are examples of a home interior monitoring system and a communication setting method that easily perform initial setting of communication between a master device and a smartphone according to a wireless connection status of the smartphone at the time of initial setting of communication between the master device and the smartphone regardless of the presence of a wireless router in wireless communication between the master device of a fixed phone and the smartphone carried by the user, and that thereby improve convenience of the user.

First Exemplary Embodiment

Figure 2:
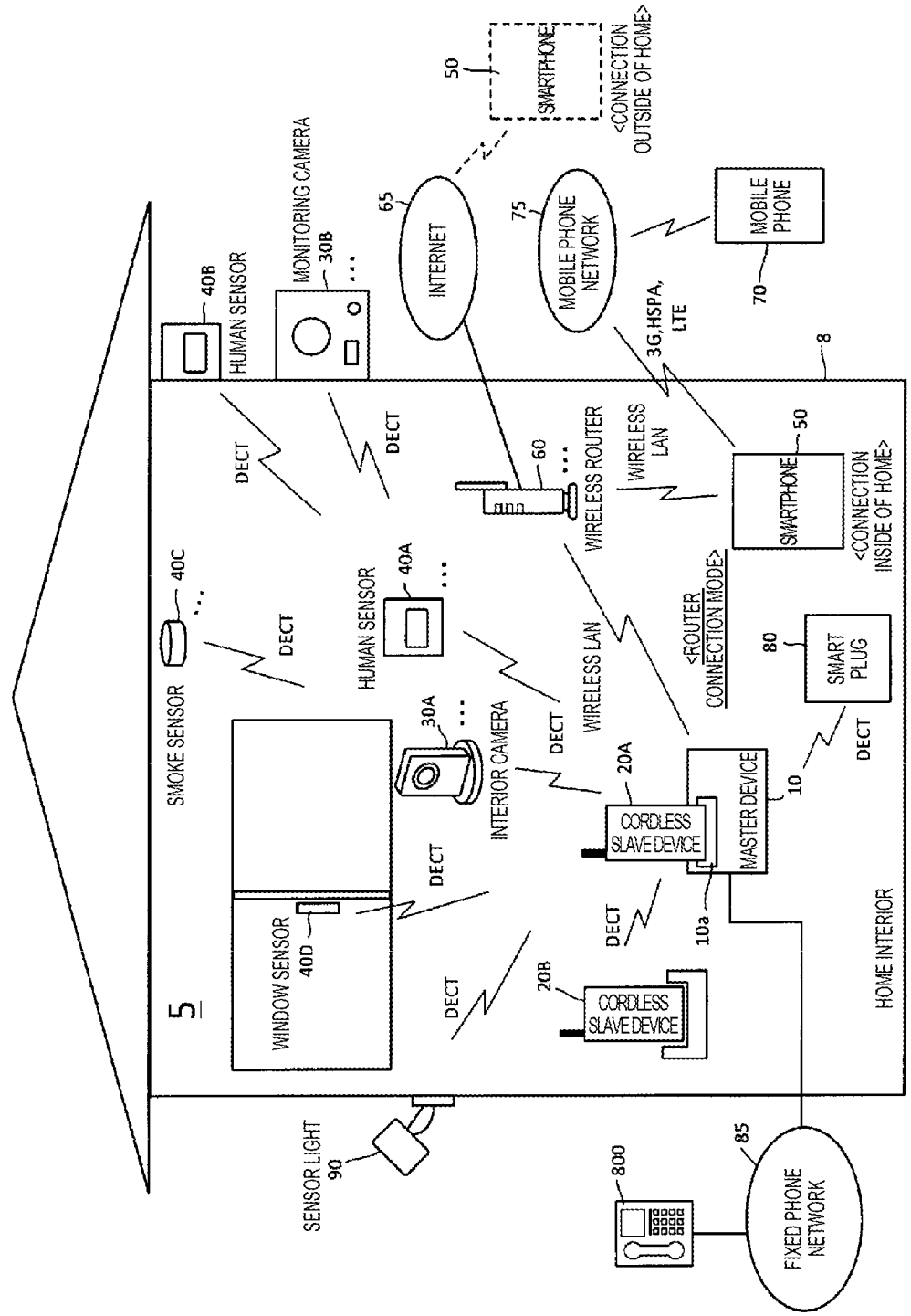
FIG. 2 is a diagram illustrating one example of a system configuration of the home interior monitoring system of each exemplary embodiment in a state where the master device and the smartphone are connected in a router connection mode.

FIG. 1 is a diagram illustrating one example of a system configuration of home interior monitoring system 5 of each exemplary embodiment in a state where master device 10 and smartphone 50 are connected in the soft AP mode. FIG. 2 is a diagram illustrating one example of a system configuration of home interior monitoring system 5 of each exemplary embodiment in a state where master device 10 and smartphone 50 are connected in the router connection mode.

Home interior monitoring system 5 illustrated in FIG. 1 is installed in, for example, home interior 8 and is configured to include at least master device 10 of a fixed phone, two cordless slave devices 20A and 20B, two cameras 30 (for example, interior camera 30A and monitoring camera 30B), various sensors 40 (for example, human sensors 40A and 40B, smoke sensor 40C, and window sensor 40D), smart plug 80, sensor light 90, and smartphone 50. Various electric devices constituting home interior monitoring system 5 are examples and can be changed in various manners. For example, electric devices constituting home interior monitoring system 5 may include a home appliance, such as a refrigerator, a microwave, or an air conditioner, that can wirelessly communicate (for example, wirelessly communicate by using the DECT wireless communication scheme described later) with master device 10.

Home interior monitoring system 5 illustrated in FIG. 2 is configured to further include wireless router 60 in addition to the constituent devices of the home interior monitoring system illustrated in FIG. 1. Home interior monitoring system 5 illustrated in FIG. 1 may also have wireless router 60. Wireless router 60 is not illustrated in FIG. 1 because wireless router 60 is not required in the soft AP mode. Hereinafter, the constituent devices of home interior monitoring system 5 will be described in order.

Master device 10 acts as a gateway related to communication with various constituent devices of home interior monitoring system 5. That is, master device 10 is a control device that controls overall operation of home interior monitoring system 5, and wirelessly connects with cordless slave devices 20A and 20B, cameras 30, sensors 40, smart plug 80, sensor light 90, and the like in a wirelessly communicable manner by using, for example, the digital enhanced cordless telecommunications (DECT) wireless communication scheme.

When initial setting for use of the soft AP mode described later is finished, master device 10 operates as an access point of a wireless LAN in the soft AP mode and thus can wirelessly communicate directly with smartphone 50 without passing through wireless router 60. As illustrated in FIG. 1, master device 10 cannot connect to Internet 65 in the soft AP mode. Thus, smartphone 50 cannot connect to master device 10 when the user is outside of the home (that is, outside of a wireless communication range between smartphone 50 and master device 10 as an access point).

When initial setting for use of the router connection mode described later is finished, master device 10 in the router connection mode operates as a communication terminal that uses the wireless LAN. Thus, master device 10 can connect to an external network (for example, Internet 65) through wireless router 60 (refer to FIG. 2) that uses the wireless LAN, and furthermore can wirelessly communicate with smartphone 50.

Master device 10 is connected to fixed phone network 85 in a wired manner and performs a mediation process for enabling a call between cordless slave devices 20A and 20B and another fixed phone 800. A call may be directly made between master device 10 and another fixed phone 800. Master device 10 has a function of recharging cordless slave device 20A inserted in insertion port 10a.

Cordless slave devices 20A and 20B are wirelessly connected with master device 10 by using the DECT wireless communication scheme and can wirelessly communicate (includes a call) with master device 10. Hereinafter, two cordless slave devices 20A and 20B will be collectively referred to as cordless slave device 20 in the case of distinction therebetween not being required.

Various sensors 40 (for example, human sensors 40A and 40B, smoke sensor 40C, and window sensor 40D) wirelessly connect with master device 10 by using the DECT wireless communication scheme. In FIG. 1 and FIG. 2, for example, window sensor 40D that detects opening and closing of a window, smoke sensor 40C that senses smoke, and human sensors 40A and 40B that sense a human being by using an infrared ray are used as sensors. Hereinafter, these types of sensors will be collectively referred to as sensor 40 in the case of distinction therebetween not being required. As described later, infrared sensor 313 (refer to FIG. 5) that is incorporated in camera 30 is also used as a human sensor.

Two cameras (for example, interior camera 30A and monitoring camera 30B) have a calling function and wirelessly connect with master device 10 by using the DECT wireless communication scheme. A call can be made between the two cameras and cordless slave devices 20A and 20B. In FIG. 1 and FIG. 2, monitoring camera 30B that images the outside of the home and interior camera 30A that images home interior 8 are used as cameras. Hereinafter, types of cameras will be collectively referred to as camera 30 in the case of distinction therebetween not being required.

Smart plug 80 has a wireless communicating function using DECT and is wirelessly connected with master device 10 by using the DECT wireless communication scheme. Smart plug 80, in accordance with an instruction sent from master device 10, switches conduction and blocking of a commercial alternating current power source or direct current power source that supplies power to various electric devices connected to smart plug 80 (for example, an air conditioner, a home appliance, an illumination, camera 30, or sensor 40). Details of smart plug 80 will be described later.

Sensor light 90 detects a motion of a human being in a monitored area (for example, the interior of the home of the user, a garden in the site of the home, or a front door) and is turned on to illuminate the surrounding area of the monitored area when the surrounding area is dark at night or the like. Luminance of sensor light 90 may be high to an extent that sensor light 90 can brightly illuminate the monitored area, or may be low to an extent that sensor light 90 is used as a warning lamp. Sensor light 90 has a wireless communicating function using DECT and is wirelessly connected with master device 10 by using the DECT wireless communication scheme. In sensor light 90, any of operating conditions of sensor light 90 can be set from smartphone 50 through master device 10. Details of sensor light 90 will be described later.

Sensor light 90 is not limited to being used for crime prevention in the site of the home of the user and apparently may be used for crime prevention in any of business places such as a store, a factory, and an office. A sensor light may not be used for crime prevention and may be used for improving convenience of a human who visits a location of installation thereof.

Smartphone 50 as a mobile phone terminal can wirelessly connect and wirelessly communicate with another mobile phone 70, another smartphone (not illustrated), or the like through mobile phone network 75 that uses various wireless communication schemes such as third generation (3G), high speed packet access (HSPA), and long term evolution (LTE).

When initial setting for use of the soft AP mode described later is finished, smartphone 50 can wirelessly communicate directly with master device 10 as an access point of the wireless LAN without passing through wireless router 60 in the soft AP mode.

When initial setting for use of the router connection mode described later is finished, smartphone 50 in the router connection mode can wirelessly connect and wirelessly communicate with master device 10 through wireless router 60 (refer to FIG. 2) that uses the wireless LAN.

Internal Configuration of Constituent Device of Home Interior Monitoring System 5

Figure 3:
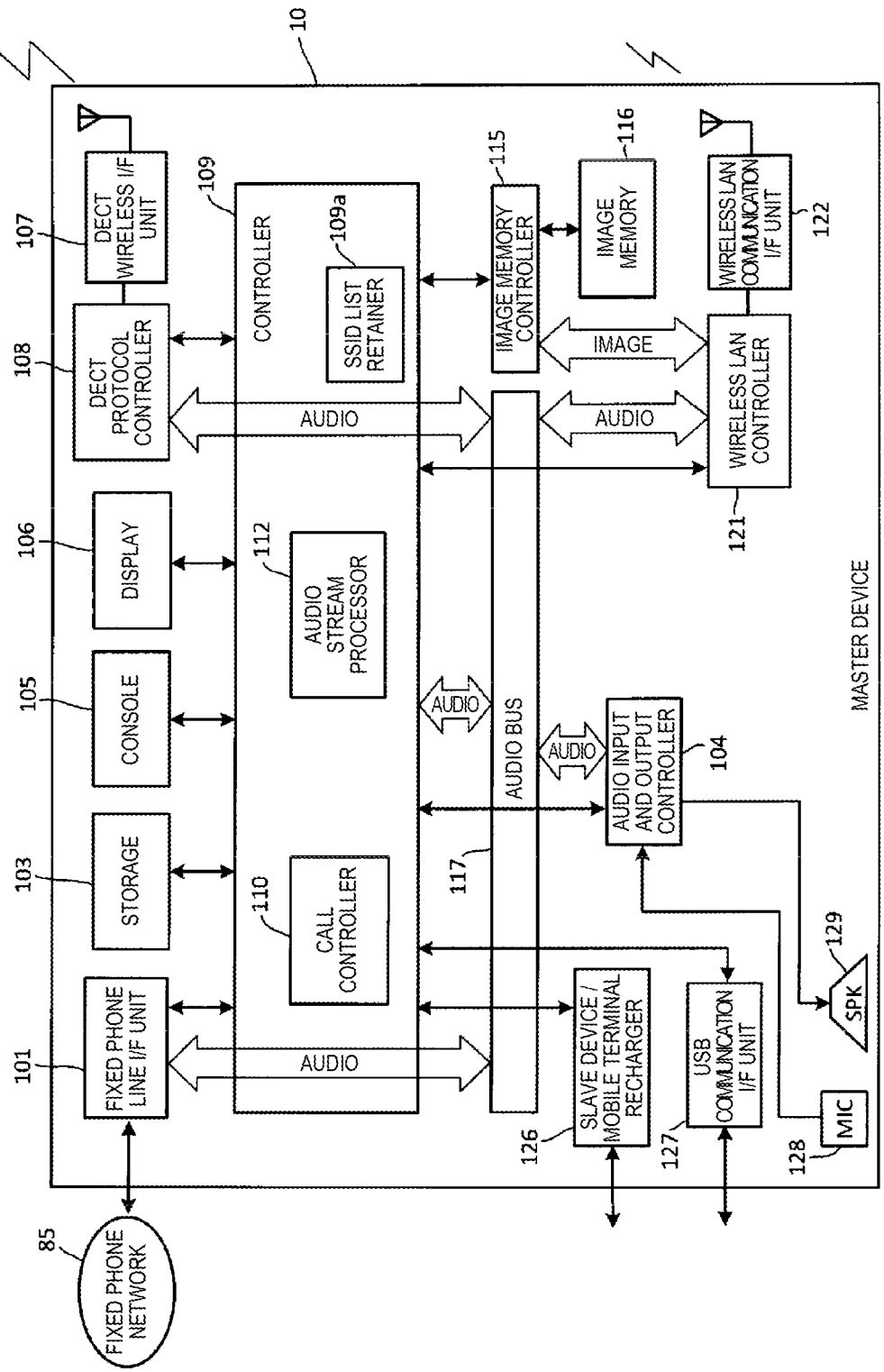
FIG. 3 is a block diagram illustrating one example of an internal configuration of the master device in the home interior monitoring system.

FIG. 3 is a block diagram illustrating one example of an internal configuration of master device 10 in home interior monitoring system 5. Master device 10 is configured to include controller 109, storage 103, console 105, and display 106. Master device 10 receives various input operations and displays information such as an image on display 106. Console 105 of master device 10 has a setup button that is pressed by the user at the time of initial setting of the wireless LAN described later. Master device 10 has, as one example of display 106, a light emitting diode (LED) for indicating the status of initial setting of a mode of wireless communication described later.

Controller 109 has call controller 110 and audio stream processor 112 and, for example, controls a call or processes audio data.

Controller 109 further has SSID list retainer 109a. SSID list retainer 109a retains a service set identifier (SSID) as identification information of wireless router 60 (that is, an access point) in wireless communication of master device 10 using the wireless LAN. SSID list retainer 109a retains at least one SSID recognized by master device 10. That is, while one wireless router 60 is in FIG. 2, wireless router 60 may be in plural numbers. In this case, SSID list retainer 109a retains a plurality of different SSIDs.

Display 106 may be configured by using a touch panel. Display 106 corresponding to a touch panel receives and outputs a user operation to controller 109 and displays display data (for example, data of a smart control setting screen described later) passed from controller 109.

Master device 10 has image memory controller 115 and image memory 116 and receives and stores image data or the like imaged by camera 30 or transferred from camera 30 in image memory 116.

Master device 10 has wireless LAN controller 121 and wireless LAN communication I/F unit 122 and sends and receives image data and audio data with smartphone 50, camera 30, or the like through wireless router 60 that uses the wireless LAN.

When initial setting for use of the soft AP mode described later is finished, master device 10 operates as an access point of the wireless LAN in the soft AP mode and wirelessly communicates directly with smartphone 50. When image data is transferred from camera 30 that is wirelessly connected by using, for example, DECT, master device 10 can send the image data to smartphone 50.

When initial setting for use of the router connection mode described later is finished, master device 10 in the router connection mode wirelessly communicates with smartphone 50 through wireless router 60 that uses the wireless LAN. When sensor detection result data (for example, information indicating that an intruder is detected) is transferred from sensor 40 that is wirelessly connected by using, for example, DECT, master device 10 can send the sensor detection result data to smartphone 50.

Master device 10 has DECT protocol controller 108 and DECT wireless I/F unit 107 and wirelessly connects and wirelessly communicates with each of cordless slave device 20, sensor 40, camera 30, smart plug 80, and sensor light 90 by using the digital enhanced cordless telecommunications (DECT) wireless communication scheme.

Master device 10 has audio bus 117, audio input and output controller 104, loudspeaker 129, and microphone 128 and inputs and outputs audio to an external unit.

Master device 10 has fixed phone line I/F unit 101 and allows a communication or a call with external fixed phone 800 that is connected to fixed phone network 85. As described above, master device 10 may control various types of processing of audio data at the time of a call in order to enable a call between external fixed phone 800 connected to fixed phone network 85 and cordless slave device 20.

Master device 10 has slave device/mobile terminal recharger 126 and recharges cordless slave device 20 or smartphone 50 inserted in insertion port 10a.

Master device 10 has USB communication I/F unit 127 and sends and receives data with a device, a memory, or the like having a Universal Serial Bus (USB) standard interface.

Master device 10 correlates various sensors 40 (for example, human sensors 40A and 40B, smoke sensor 40C, and window sensor 40D) with the plurality of cameras 30 and writes and registers the correlations in storage 103. For example, human sensor 40B and monitoring camera 30B are installed in close locations outside of the home and thus are registered in correlation with each other. As described later, monitoring camera 30B incorporates infrared sensor 313 (refer to FIG. 5), which is a human sensor, and thus is registered in correlation with infrared sensor 313. Any of human sensor 40A, smoke sensor 40C, and window sensor 40D is installed in home interior 8 and thus is registered in correlation with interior camera 30A.

Figure 4:
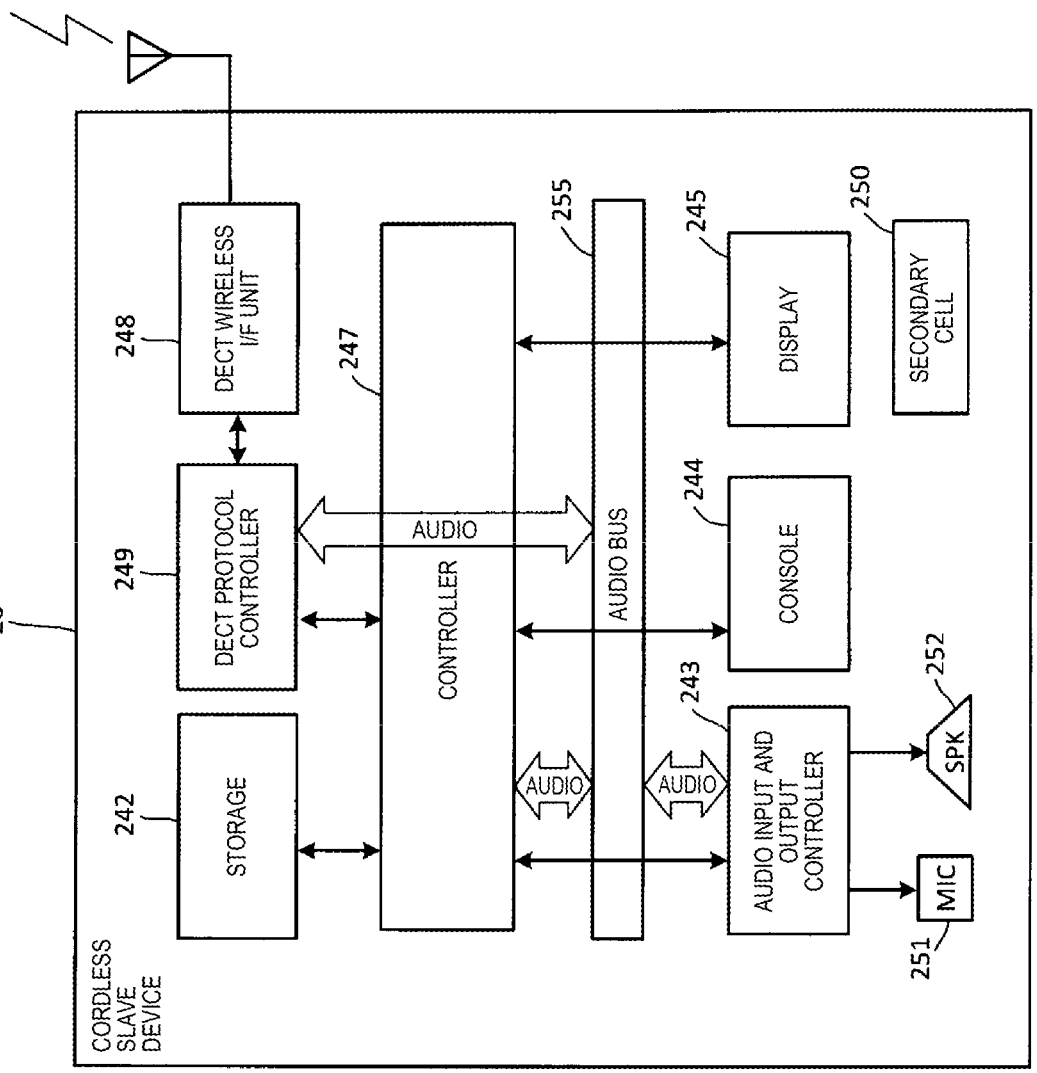
FIG. 4 is a block diagram illustrating one example of an internal configuration of a cordless slave device in the home interior monitoring system.

FIG. 4 is a block diagram illustrating one example of an internal configuration of cordless slave device 20 in home interior monitoring system 5. Cordless slave device 20 is configured to include controller 247, storage 242, console 244, and display 245. Cordless slave device 20 receives various input operations and displays information such as an image on display 245.

Cordless slave device 20 has DECT protocol controller 249 and DECT wireless I/F unit 248 and wirelessly connects and wirelessly communicates with each of master device 10, sensor 40, and camera 30 by using the DECT wireless communication scheme.

Cordless slave device 20 has audio bus 255, audio input and output controller 243, loudspeaker 252, and microphone 251 and inputs and outputs audio to an external unit (for example, external fixed phone 800) in a call.

Cordless slave device 20 supplies power required for operation to each unit of cordless slave device 20 by using secondary cell 250.

Figure 5:
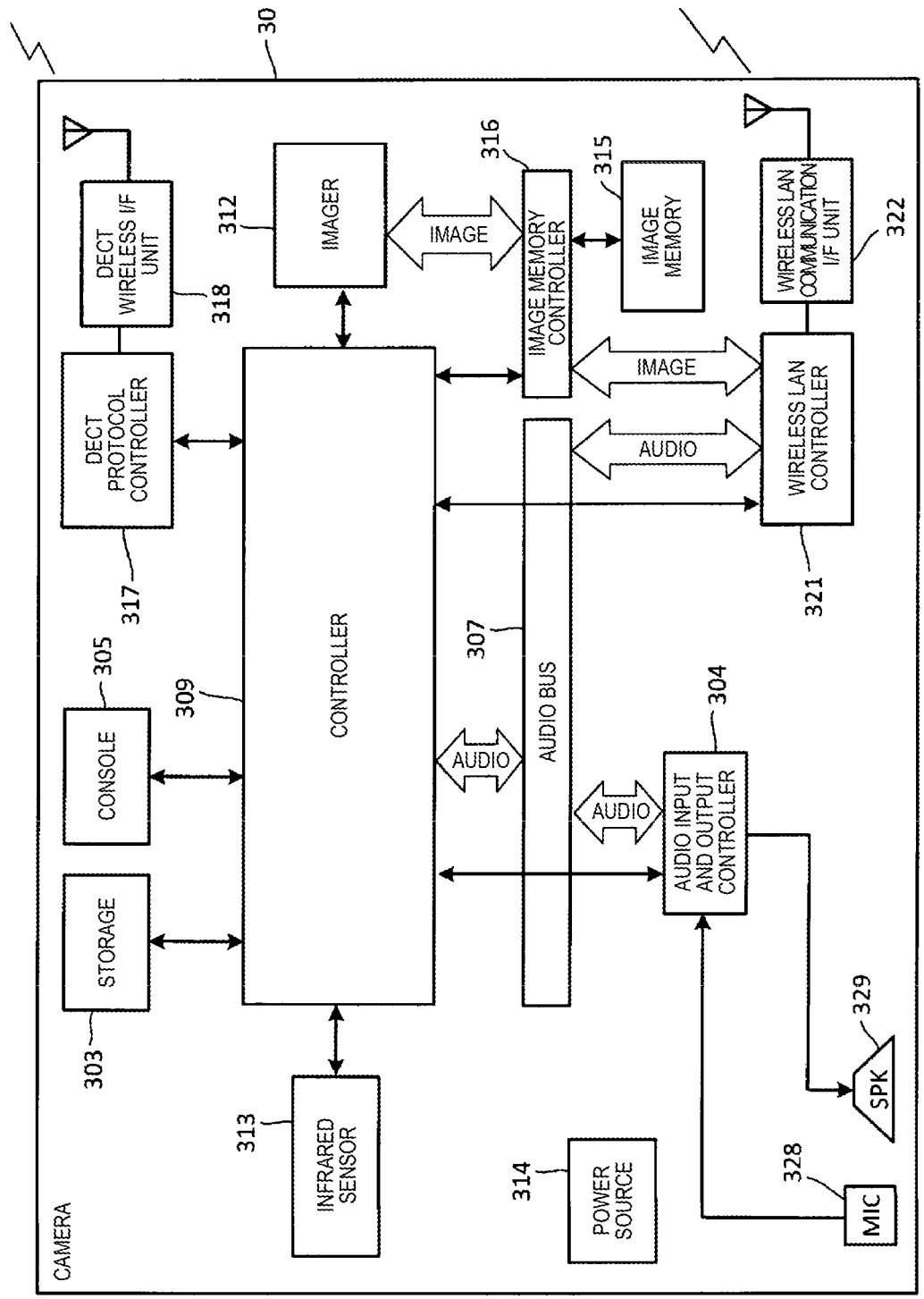
FIG. 5 is a block diagram illustrating one example of an internal configuration of a camera in the home interior monitoring system.

FIG. 5 is a block diagram illustrating one example of an internal configuration of camera 30 in home interior monitoring system 5. Interior camera 30A and monitoring camera 30B as one example of camera 30 have almost the same specifications. Camera 30 is configured to include controller 309, storage 303, and console 305. Camera 30 performs an operation related to imaging and receives input operations.

Camera 30 has DECT protocol controller 317 and DECT wireless I/F unit 318 and wirelessly connects and wirelessly communicates with master device 10 by using the DECT wireless communication scheme.

Camera 30 has wireless LAN controller 321 and wireless LAN communication I/F unit 322 and sends and receives image data and audio data with master device 10, smartphone 50, or the like through wireless router 60 that uses the wireless LAN.

Camera 30 has audio bus 307, audio input and output controller 304, loudspeaker 329, and microphone 328 and inputs and outputs audio to an external unit (for example, cordless slave device 20) in a call.

Camera 30 has imager 312, image memory controller 316, and image memory 315 and stores image data imaged by imager 312 in image memory 315. Imager 312 has a lens and an imaging element (an image sensor such as a charge coupled device (CCD) or a complementary metal oxide semiconductor (CMOS)).

Camera 30 incorporates, as a human sensor, infrared sensor (pyroelectric sensor) 313 that is a passive infrared (PIR) sensor. Infrared sensor 313 senses the presence of a human by detecting a change in heat (infrared ray) emitted by a human (human being). Camera 30 has power source 314 that is configured of, for example, a commercial alternating current power source or direct current power source.

Figure 6:
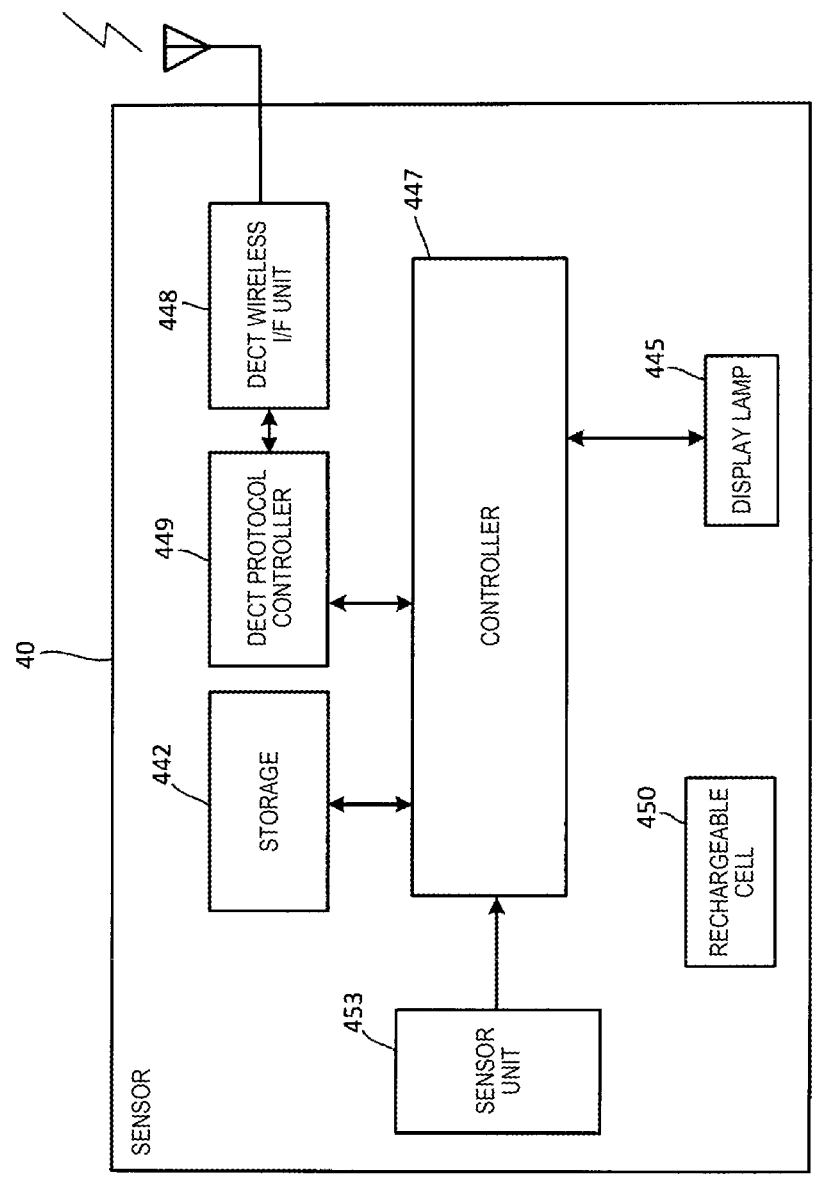
FIG. 6 is a block diagram illustrating one example of an internal configuration of a sensor in the home interior monitoring system.

FIG. 6 is a block diagram illustrating one example of an internal configuration of sensor 40 in home interior monitoring system 5. Sensor 40 is configured to include controller 447, storage 442, and display lamp 445. Sensor 40 performs a predetermined detecting operation such as turning on display lamp 445 in the case of detecting any event (for example, an intruder, a smoke, or opening or closing of a window).

Sensor 40 has DECT protocol controller 449 and DECT wireless I/F unit 448, wirelessly connects and wirelessly communicates with master device 10 by using the DECT wireless communication scheme, and sends sensor detection result data to master device 10 when detecting the above event.

Sensor unit 453 varies according to the type of sensor 40. For example, in the case of human sensors 40A and 40B, sensor unit 453 is a PIR sensor that senses a human by using a change in an infrared ray. In the case of window sensor 40D that detects opening and closing of a window or the like, sensor unit 453 is a reed switch that is switched to ON/OFF by opening and closing thereof. In the case of smoke sensor 40C, sensor unit 453 is a light emitter and a light receiver that sense a smoke by emitted light being blocked by a smoke.

Rechargeable cell 450 is a rechargeable cell and supplies a required amount of power to each unit of sensor 40.

Figure 7:
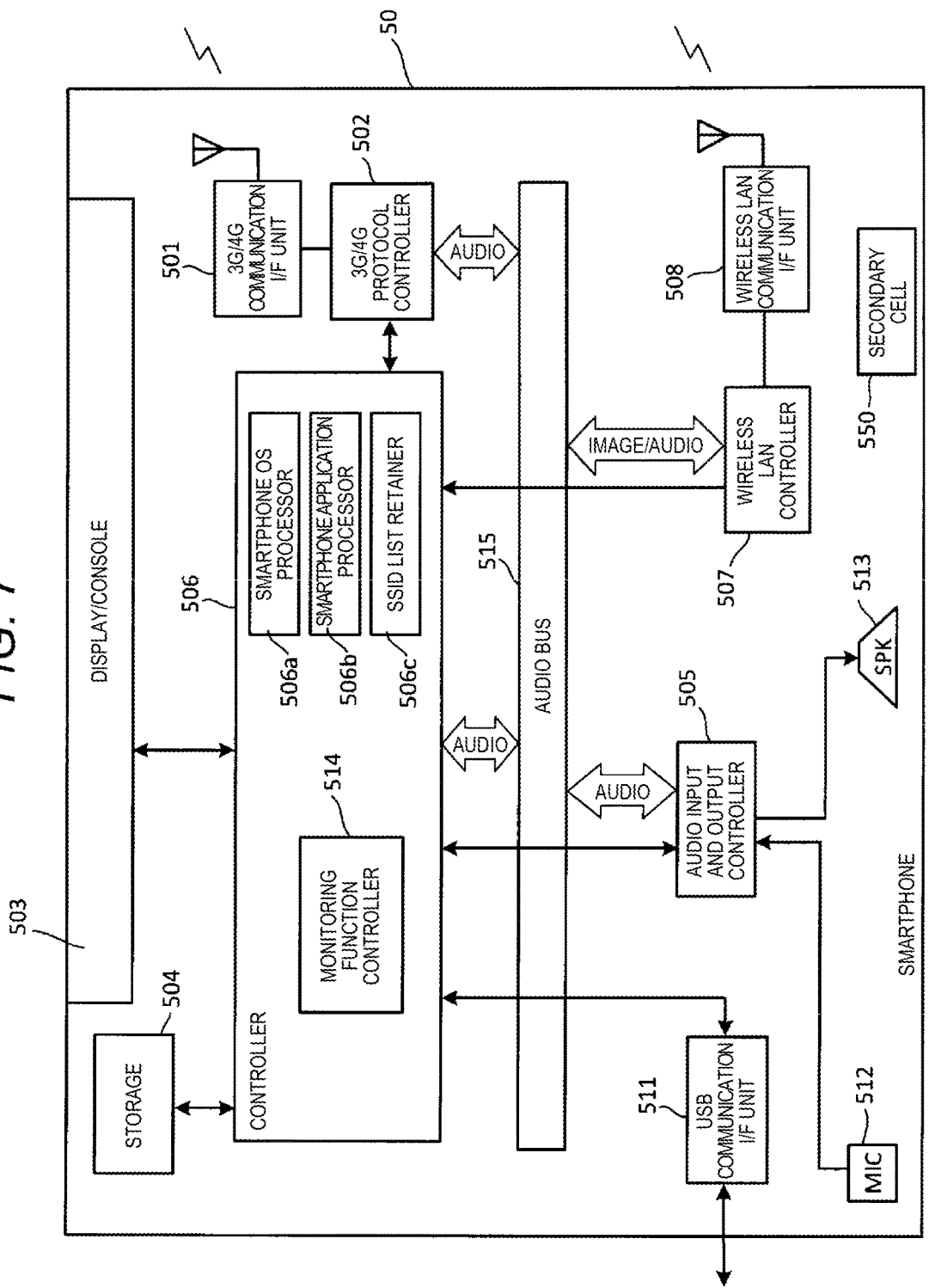
FIG. 7 is a block diagram illustrating one example of an internal configuration of the smartphone in the home interior monitoring system.

FIG. 7 is a block diagram illustrating one example of an internal configuration of smartphone 50 in home interior monitoring system 5. Smartphone 50 is configured to include controller 506, storage 504, and display/console (configured by using, for example, a touch panel) 503. Smartphone 50 receives various input operations and displays information such as an image on display/console 503.

Controller 506 incorporates monitoring function controller 514 that can set various types of setting information as to camera 30 or sensor light 90. Display/console 503 is a display input in which a display and an console are integrated, and displays information such as an image or an icon on a screen or displays a setting information generation screen (not illustrated) for sensor light 90, a screen for prompting the user to operate master device 10 at the time of initial setting described later (refer to FIG. 14 and FIG. 18), various password input screens (refer to FIG. 19), or a name input screen (refer to FIG. 20) for master device 10 and smartphone 50, and receives a tap operation (or a touch operation) performed on the screen by the user.

Controller 506 has smartphone OS processor 506a, smartphone application processor 506b, and SSID list retainer 506c.

Smartphone OS processor 506a executes an operating system (OS) as base software of smartphone 50. Details of operation of smartphone OS processor 506a will be described later.

When an instruction to boot, terminate, or execute an application installed in smartphone 50 is input by a user operation performed on display/console 503, smartphone application processor 506b boots or terminates the application or performs a process in the application. Details of operation of smartphone application processor 506b will be described later.

SSID list retainer 506c retains an SSID as identification information of wireless router 60 in the router connection mode or master device 10 in the soft AP mode (that is, either is an access point) for smartphone 50. SSID list retainer 506c retains at least one SSID recognized by smartphone 50. That is, while one master device 10 and one wireless router 60 are illustrated in FIG. 1 and FIG. 2, master device 10 and wireless router 60 may be in plural numbers. In this case, SSID list retainer 506c retains three or more different SSIDs.

Smartphone 50 has 3G/4G protocol controller 502 and 3G/4G wireless I/F unit 501 and wirelessly connects and wirelessly communicates with mobile phone 70 connected to mobile phone network 75 or another smartphone by using the third generation (3G) or fourth generation (4G) wireless communication scheme (includes, for example, HSPA and LTE).

Smartphone 50 has audio bus 515, audio input and output controller 505, loudspeaker 513, and microphone 512 and inputs and outputs audio to an external unit.

Smartphone 50 has wireless LAN controller 507 and wireless LAN communication I/F unit 508 and sends and receives image data and audio data with master device 10, camera 30, or the like through wireless router 60 that uses the wireless LAN.

When initial setting for use of the soft AP mode described later is finished, smartphone 50 wirelessly communicates directly with master device 10 in the soft AP mode. When, for example, master device 10 receives image data transferred from camera 30 that is wirelessly connected by DECT, smartphone 50 can receive the image data transferred from master device 10. When a user operation is input on display/console 503, smartphone 50 can directly send information corresponding to the user operation to master device 10.

When initial setting for use of the router connection mode described later is finished, smartphone 50 in the router connection mode wirelessly communicates with master device 10 through wireless router 60 that uses the wireless LAN. When, for example, master device 10 receives sensor detection result data (for example, information indicating that an intruder is detected) transferred from sensor 40 that is wirelessly connected by DECT, smartphone 50 can receive the sensor detection result data transferred from master device 10. In addition, when a user operation is input on display/console 503, smartphone 50 can send information corresponding to the user operation to master device 10 through wireless router 60.

When an input operation of the user who operates smartphone 50 is provided, smartphone 50 sends a signal generated by the operation to master device 10 directly or through wireless router 60 and, furthermore, can create new setting information for sensor light 90, smart plug 80, or the like or make any change in the setting information through master device 10.

Smartphone 50 has USB communication I/F unit 511 and sends and receives data with a device, a memory, or the like having a Universal Serial Bus (USB) standard interface.

Smartphone 50 supplies power required for operation to each unit of smartphone 50 by using secondary cell 550.

Figure 8:
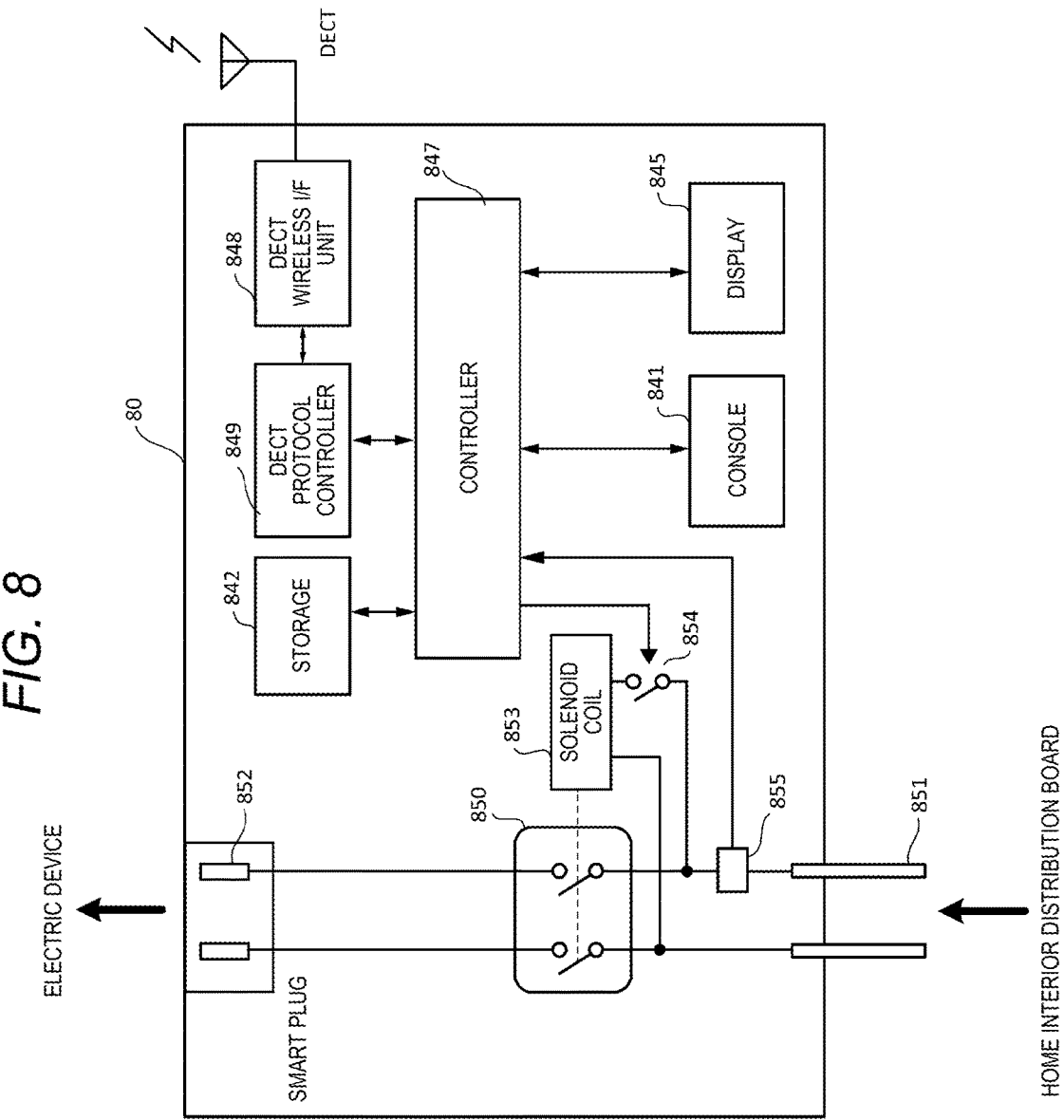
FIG. 8 is a block diagram illustrating one example of an internal configuration of a smart plug in the home interior monitoring system.

FIG. 8 is a block diagram illustrating one example of an internal configuration of smart plug 80 in home interior monitoring system 5. Smart plug 80 is configured to include at least controller 847, storage 842, and display 845 that includes a display lamp. For example, schedule setting information related to ON/OFF conditions of smart plug 80 that can be set or changed by smart plug 80 wirelessly communicating with master device 10 by using DECT is registered in storage 842.

Smart plug 80 has DECT protocol controller 849 and DECT wireless I/F unit 848, wirelessly connects and wirelessly communicates with master device 10 by using the DECT wireless communication scheme, and switches supply or blocking of a commercial alternating current power source or direct current power source to each electric device (for example, an air conditioner, a home appliance, an illumination, camera 30, and sensor 40) connected to each smart plug 80 in accordance with a signal sent through the wireless connection (that is, a switching control signal from master device 10 based on a user operation performed on smartphone 50).

Smart plug 80 has switch unit 850. Switch unit 850 connects or blocks a power supply line as a power source between outlet terminal 852 connected to an electric device and plug terminal 851 connected to an outlet terminal (not illustrated) that is present in various positions (positions such as a dining room, a living room, and a bedroom) in home interior 8 and is connected from, for example, a distribution board (not illustrated) in home interior 8. Switch unit 850 is driven by, for example, solenoid coil 853. A drive current from an alternating current power source flowing into solenoid coil 853 closes and connects switch unit 850 and provides conduction between plug terminal 851 and outlet terminal 852. Switch unit 854 switches ON/OFF of the drive current flowing into solenoid coil 853 by control of controller 847.

Current detecting element 855 is disposed between plug terminal 851 and switch unit 850. When a current flows between plug terminal 851 and outlet terminal 852, current detecting element 855 detects the current and outputs a detection signal to controller 847. When, for example, an input operation is provided from console 841, controller 847 displays the amount of power being supplied to electric devices (supplied power amount) on display 845 in the case of receiving the detection signal from current detecting element 855.

Controller 847, in the case of, for example, DECT wireless I/F unit 848 receiving an indication signal for an operating mode of smart plug 80 from master device 10 by an instruction from smartphone 50 based on a user operation, outputs a switching control signal for conduction between plug terminal 851 and outlet terminal 852 to switch unit 854. Accordingly, conduction is provided between plug terminal 851 and outlet terminal 852. Meanwhile, controller 847, in the case of, for example, DECT wireless I/F unit 848 receiving an indication signal for an operation stop mode of smart plug 80 from master device 10 by an instruction from smartphone 50 based on a user operation, outputs a switching control signal for non-conduction between plug terminal 851 and outlet terminal 852 to switch unit 854. Accordingly, non-conduction is provided between plug terminal 851 and outlet terminal 852.

Controller 847 references the schedule setting information stored in storage 842 and, when the time of the operating mode included in the schedule setting information arrives, outputs a switching control signal for conduction between plug terminal 851 and outlet terminal 852 to switch unit 854. Accordingly, conduction is provided between plug terminal 851 and outlet terminal 852. During the time of the operating mode, the state of conduction between plug terminal 851 and outlet terminal 852 is maintained, provided that, for example, DECT wireless I/F unit 848 does not receive an indication signal for the operation stop mode that is sent from master device 10 by an instruction from smartphone 50 based on a user operation.

Controller 847 references the schedule setting information stored in storage 842 and, when the time of the operation stop mode included in the schedule setting information arrives, outputs a switching control signal for non-conduction between plug terminal 851 and outlet terminal 852 to switch unit 854. Accordingly, non-conduction is provided between plug terminal 851 and outlet terminal 852. During the time of the operation stop mode, the state of non-conduction between plug terminal 851 and outlet terminal 852 is maintained, provided that, for example, DECT wireless I/F unit 848 does not receive an indication signal for the operating mode that is sent from master device 10 by an instruction from smartphone 50 based on a user operation.

Figure 9:
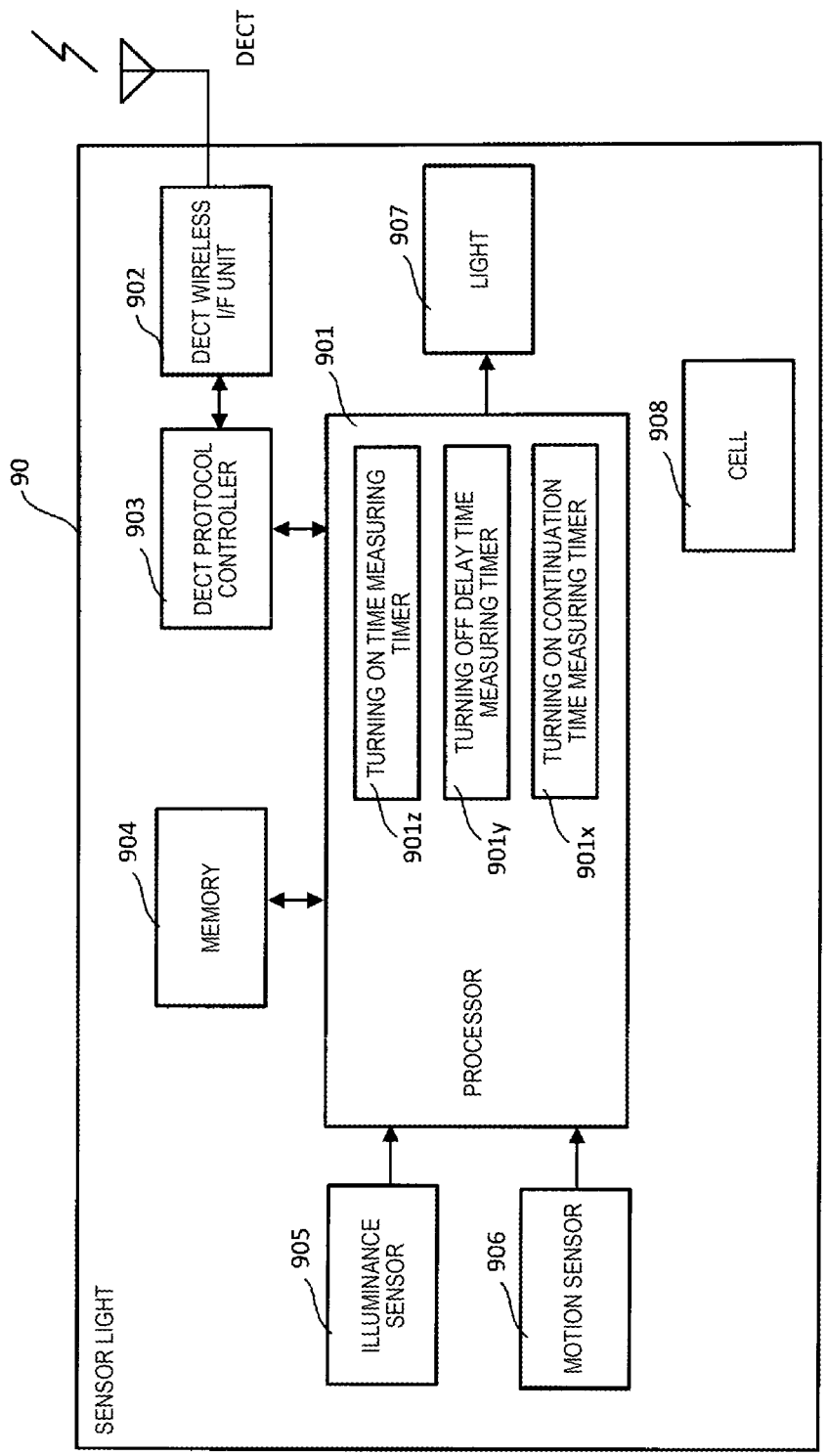
FIG. 9 is a block diagram illustrating one example of an internal configuration of a sensor light in the home interior monitoring system.

FIG. 9 is a block diagram illustrating one example of an internal configuration of sensor light 90 in home interior monitoring system 5. Sensor light 90 is configured to include processor 901, DECT wireless I/F unit 902, DECT protocol controller 903, memory 904, illuminance sensor 905, motion sensor 906, light 907, and cell 908.

Processor 901 wirelessly connects and wirelessly communicates with master device 10 by using the DECT wireless communication scheme through DECT wireless I/F unit 902 and DECT protocol controller 903. Sensor light 90 wirelessly communicates with master device 10 and thus can connect with various devices such as camera 30, sensor 40, smartphone 50, and smart plug 80.

Processor 901 incorporates turning on time measuring timer 901z, turning off delay time measuring timer 901y, and turning on continuation time measuring timer 901x.

Turning on time measuring timer 901z measures the amount of turning on time of light 907.

Turning off delay time measuring timer 901y measures the amount of turning off delay time. The turning off delay time indicates the time of continuation of the state of non-detection of a moving object from when motion sensor 906 does not detect a motion of a moving object (for example, a human being) until light 907 is turned off.

Turning on continuation time measuring timer 901x measures the amount of turning on continuation time that indicates the time of continuation of turning on from the start of turning on of light 907. An upper limit value is posed on the turning on continuation time. This upper limit value is the maximum value of the amount of turning on time in which light 907 can be continuously turned on, in view of the fact that sensor light 90 is driven by a battery (that is, cell 908). Light 907 is forced to be turned off by processor 901 in the case of being turned on up to the upper limit value. The amount of turning on time measured by turning on time measuring timer 901z can also be used as the turning on continuation time. In this case, turning on continuation time measuring timer 901x may be removed from sensor light 90.

Processor 901 forces light 907 to be turned off regardless of the status of a measured value of the turning off delay time when a measured value of the turning on continuation time of light 907 measured by turning on continuation time measuring timer 901x exceeds a set value (that is, the above upper limit value) of the turning on continuation time stored in memory 904.

Processor 901 compares the measured value of the turning off delay time measured by turning off delay time measuring timer 901y with a set value of the turning off delay time stored in memory 904 and controls turning on/turning off of light 907 according to the comparison result.

In the case of detecting the presence of a human while light 907 is turned off, processor 901 starts measuring the amount of turning on time of light 907 and starts turning on light 907.

Processor 901 turns off light 907 in the case of determining that, while light 907 is turned on, the measured value of the turning off delay time exceeds the set value of the turning off delay time and that a measured value of the turning on time of light 907 exceeds a set value of the turning on time of light 907. For example, considered is the case of the presence of a human not being detected when the set value of the turning on time of light 907 is 30 seconds, the set value of the turning off delay time is 5 seconds, and the measured value of the turning on time of light 907 is 25 seconds. In this case, if the state of non-detection of the presence of a human continues for 5 seconds from the non-detection of the presence of a human, the measured value of the turning off delay time reaches the set value of the turning off delay time (5 seconds), and the measured value of the turning on time of light 907 reaches the set value of the turning on time of light 907 (30 seconds). Thus, light 907 is turned off. In this example, light 907 is turned on for total 30 seconds.

Processor 901, while sensor light 90 is driven by cell 908 and thus can communicate with master device 10 by using the DECT wireless communication scheme, sets communication of sensor light 90 into a sleep mode (that is, a mode in which communication is not performed) except when sensor light 90 is required to wirelessly communicate with master device 10 (for example, when sensor light 90 detects the presence of a human or periodically communicates with master device 10). Accordingly, since sensor light 90 is not required to be set into a typical communication mode with master device 10, an increase in the amount of power consumption can be reduced.

The set value of the turning off delay time can be set by using, for example, two methods. In a first setting method, processor 901 stores a turning off delay time table (not illustrated) in advance in memory 904, references the turning off delay time table, and reads and acquires the set value of the turning off delay time corresponding to the set value of the turning on time of light 907.

In a second setting method, processor 901 measures the amount of turning on time of light 907, calculates a predetermined proportion of the measured value (for example, 10% of the measured value of the turning on time), and sets the calculated value as the set value of the turning off delay time. The predetermined proportion is not limited to 10% and can be set to any value such as 5% or 20%.

The set value of the turning off delay time may be set in sensor light 90 through master device 10 by input of a setting by the user who operates smartphone 50. For example, when information as to the set value of the turning off delay time input by a setting operation of the user who operates smartphone 50 is sent from smartphone 50 to master device 10, master device 10 receives the information as to the set value of the turning off delay time. Then, master device 10 sends the information as to the set value of the turning off delay time to sensor light 90. Sensor light 90, when receiving the information as to the set value of the turning off delay time, writes the information in memory 904, and thereby setting can be completed.

Also assumed is, for example, the case of continuation of the state of non-detection during the turning off delay time after a motion of a human being is finally not detected when the measured value of the turning on time exceeds 70 seconds while the set value of the turning on time of light 907 is 20 seconds. In this case, in the first setting method, if the turning off delay time table (not illustrated) is referenced, the set value of the turning off delay time is 5 seconds. Meanwhile, in the second setting method, the set value of the turning off delay time is 7 seconds which are 10% of the measured value of the turning on time until a motion of a human being is not detected. Therefore, light 907 is turned on for total 75 seconds in the first setting method, while light 907 is turned on for total 77 seconds in the second setting method. That is, in the case of setting the set value of the turning off delay time in the first setting method, the amount of time in which light 907 is turned on is decreased by 2 seconds compared with the case of setting in the second setting method, and this is preferable for battery-driven sensor light 90 from the viewpoint of a decrease in power consumption. Meanwhile, in the case of setting in the second setting method, light 907 is turned on 2 seconds longer than in the case of setting in the first setting method, and this is said to be more preferable from the viewpoint of securing a certain amount of turning on time of light 907 even if a motion of a human being is not detected.

Also assumed is, for example, the case of continuation of the state of non-detection during the turning off delay time after a motion of a human is finally not detected when the measured value of the turning on time exceeds 20 seconds while the set value of the turning on time of light 907 is 20 seconds. In this case, in the first setting method, if the turning off delay time table (not illustrated) is referenced, the set value of the turning off delay time is 5 seconds. Meanwhile, in the second setting method, the set value of the turning off delay time is 2 seconds which are 10% of the measured value of the turning on time. Therefore, light 907 is turned on for total 25 seconds in the first setting method, while light 907 is turned on for total 22 seconds in the second setting method. That is, determination as to which of the first setting method and the second setting method is to be used to set the set value of the turning off delay time depends on the length of the measured value of the turning on time of light 907 until when a motion of a human is not detected. The set value of the turning off delay time is set by using any setting method of the first setting method and the second setting method.

The first setting method/the second setting method as a method for setting the turning off delay time can be selected by an operation switch (not illustrated) incorporated in sensor light 90 or by smartphone 50 through master device 10.

Light 907 is configured of, for example, a white LED that is an illuminant, and a reflector that reflects light projected from the white LED forward. The illuminant is not limited to the white LED and may be an LED of color other than white, an incandescent lamp, a fluorescent lamp, a halogen lamp, or a xenon lamp. The present exemplary embodiment uses a white LED that consumes less power and is close to natural light.

Memory 904 stores a control program executed by processor 901 and various types of data. Various types of data include a setting information table (not illustrated), the turning off delay time table (not illustrated), and the like.

Illuminance sensor 905 as one example of a sensor senses the brightness of the surrounding area and is a photodiode that senses light in a region of a wavelength close to the wavelength of light sensed by an eye of a human being, that is, a photodiode that has a spectral sensitivity characteristic close to an eye of a human being. An image sensor may be used in illuminance sensor 905. In this case, illuminance can be acquired from the luminance value of each pixel of the image sensor, and an image can be acquired from the luminance values of all pixels.

Motion sensor 906 as one example of a sensor has an LED and a photodiode, irradiates the monitored area with near-infrared light from the LED, receives reflective light in the photodiode, and detects a motion of a human being based on a change in the reflective light. While a motion of a human being as one example of a moving object is detected, a motion of not only a human being but also an animal such as a dog or a cat or a structure such as a small or large vehicle or a robot may be detected. While irradiation uses near-infrared light, irradiation may use ultraviolet light or the like, and a motion of a moving object may be detected from a change in the reflective light. Ultrasonic wave irradiation may be used instead of light irradiation, and a motion of a moving object may be detected from a reflective wave. While motion sensor 906 detects a motion of a moving object, motion sensor 906 may be capable of detecting the presence of a moving object even if the moving object does not move, in the case of the moving object being expected to have an extremely small motion. For example, an infrared sensor (pyroelectric sensor) that is a passive infrared (PIR) sensor and, as a human sensor, senses infrared light emitted by a human body may be used as motion sensor 906. In the case of using a pyroelectric sensor, there is no light emission unlike an LED, and power is saved.

Cell 908 is, for example, four D dry cells that are used as a power source of sensor light 90. As a cell, not only a primary cell such as a manganese dry cell or an alkaline dry cell but also a rechargeable secondary cell such as a nickel-hydrogen battery, a lithium-ion cell, or a lead battery may be used. While the present exemplary embodiment uses a cell as a power source of sensor light 90, a power source device that is connected to a commercial alternating current power source and converts a commercial alternating current to output a predetermined voltage may be incorporated instead of a cell.

Operation of Initial Setting of Mode of Wireless Communication Between Master Device 10 and Smartphone 50

Next, an operating procedure for initial setting of a mode of wireless communication that is to be performed in advance in order to allow wireless communication between master device 10 and smartphone 50 at the time of actual use thereof will be described with reference to FIG. 10 to FIG. 26. First, a summary of initial setting of a mode of wireless communication between master device 10 and smartphone 50 will be described with reference to FIG. 10.

Figure 10:
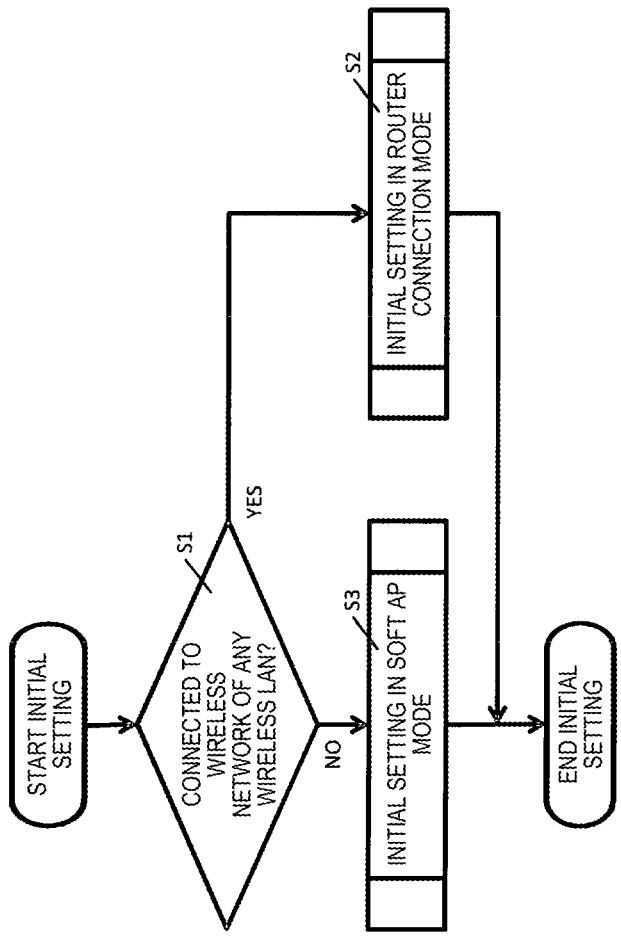
FIG. 10 is a flowchart illustrating one example of a determination procedure for a mode of wireless communication with respect to the master device in the smartphone of a first exemplary embodiment.

FIG. 10 is a flowchart illustrating one example of a determination procedure for a mode of wireless communication with master device 10 in smartphone 50 of the first exemplary embodiment. In the following description, initial setting of a mode of wireless communication of master device 10 is a process of determining one of the router connection mode and the soft AP mode to perform the initial setting in order to allow wireless communication between master device 10 and smartphone 50 and, furthermore, registering in advance a connection destination of wireless communication of master device 10 in either case of the modes of wireless communication.

In FIG. 10, smartphone 50 determines whether or not smartphone 50 is connected to any wireless network of the wireless LAN (for example, Wifi (registered trademark)) at the start of initial setting for registering a connection destination of master device 10 in wireless communication (S1).

Smartphone 50, in the case of determining that smartphone 50 is in a state previously wirelessly connected to a wireless network of any wireless LAN (for example, the wireless LAN that uses wireless router 60) (YES in S1), determines initial setting of a mode of wireless communication with master device 10 to be performed by using the router connection mode that uses wireless router 60 (S2).

Meanwhile, smartphone 50, in the case of determining that smartphone 50 is in a state not wirelessly connected to any wireless network of the wireless LAN (NO in S1), determines initial setting of a mode of wireless communication with master device 10 to be performed by using the soft AP mode that does not use wireless router 60 (S3).

In other words, smartphone 50, at the start of initial setting for registering a connection destination of master device 10 in wireless communication, determines a mode of wireless communication with master device 10 to be the router connection mode or the soft AP mode according to whether wireless communication is performed through a wireless router (for example, wireless router 60) using any wireless LAN or not.

Initial Setting in Router Connection Mode

Figure 11:
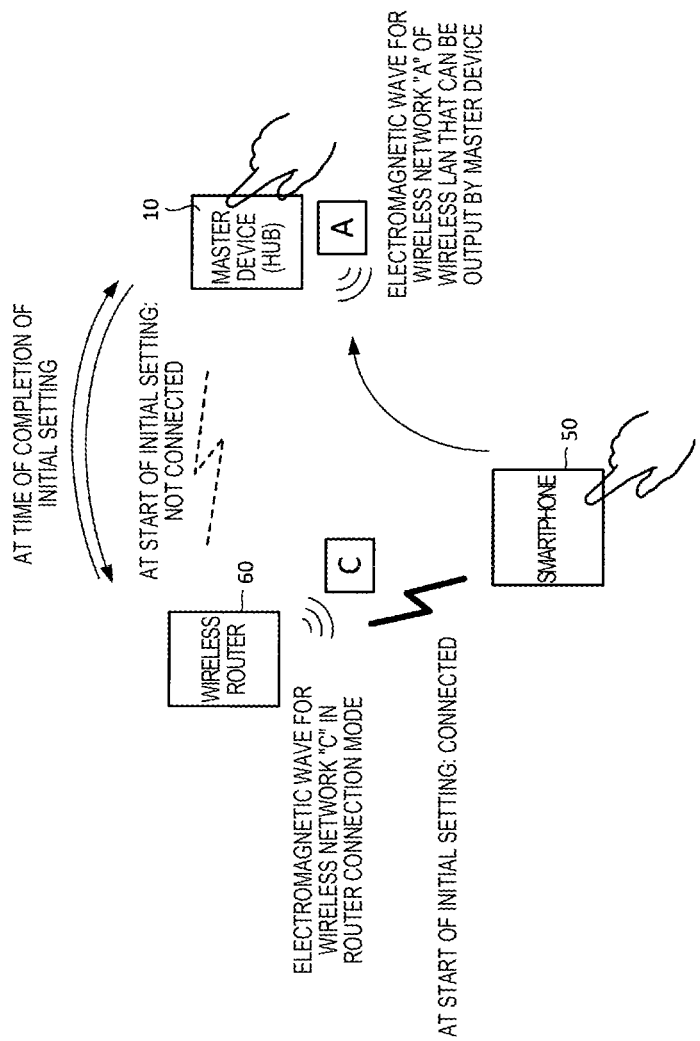
FIG. 11 is a descriptive diagram illustrating one example of a summary of operation of initial setting in the router connection mode.
Figure 12:
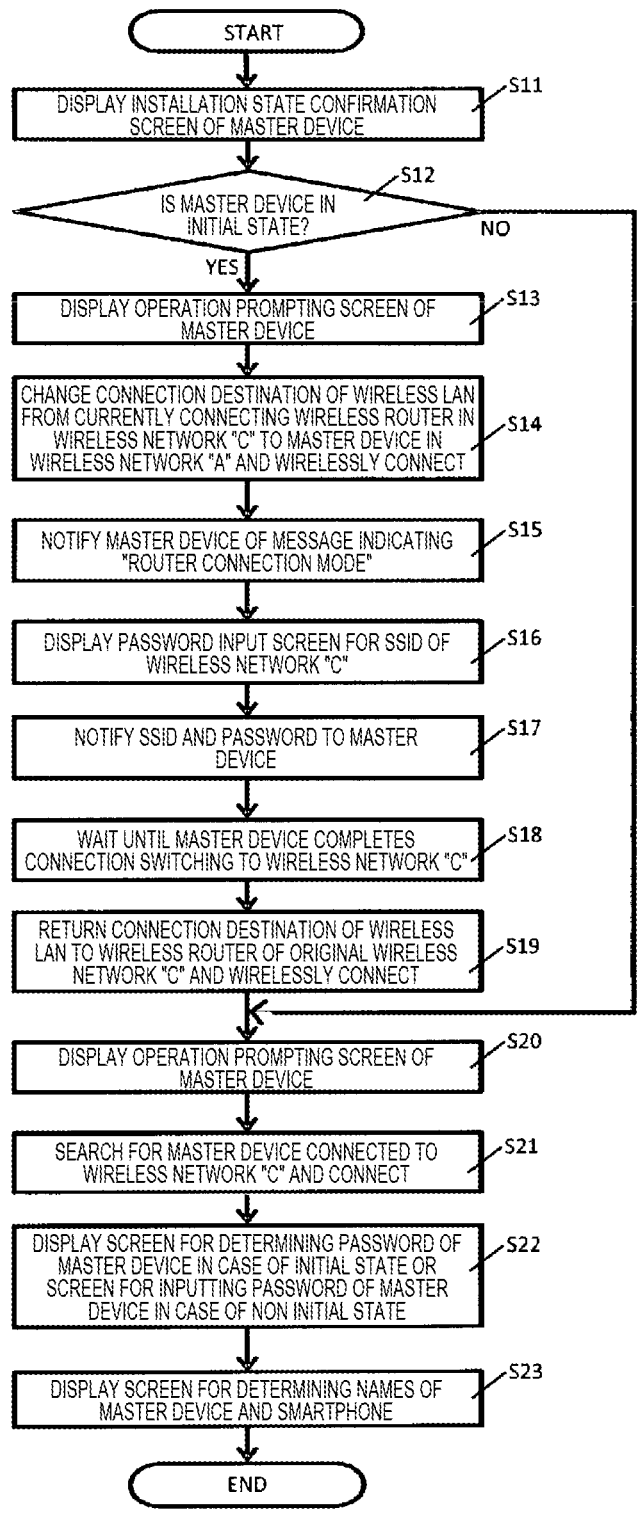
FIG. 12 is a flowchart illustrating one example of an operating procedure for initial setting in the router connection mode in the smartphone of the first exemplary embodiment.
Figure 23:
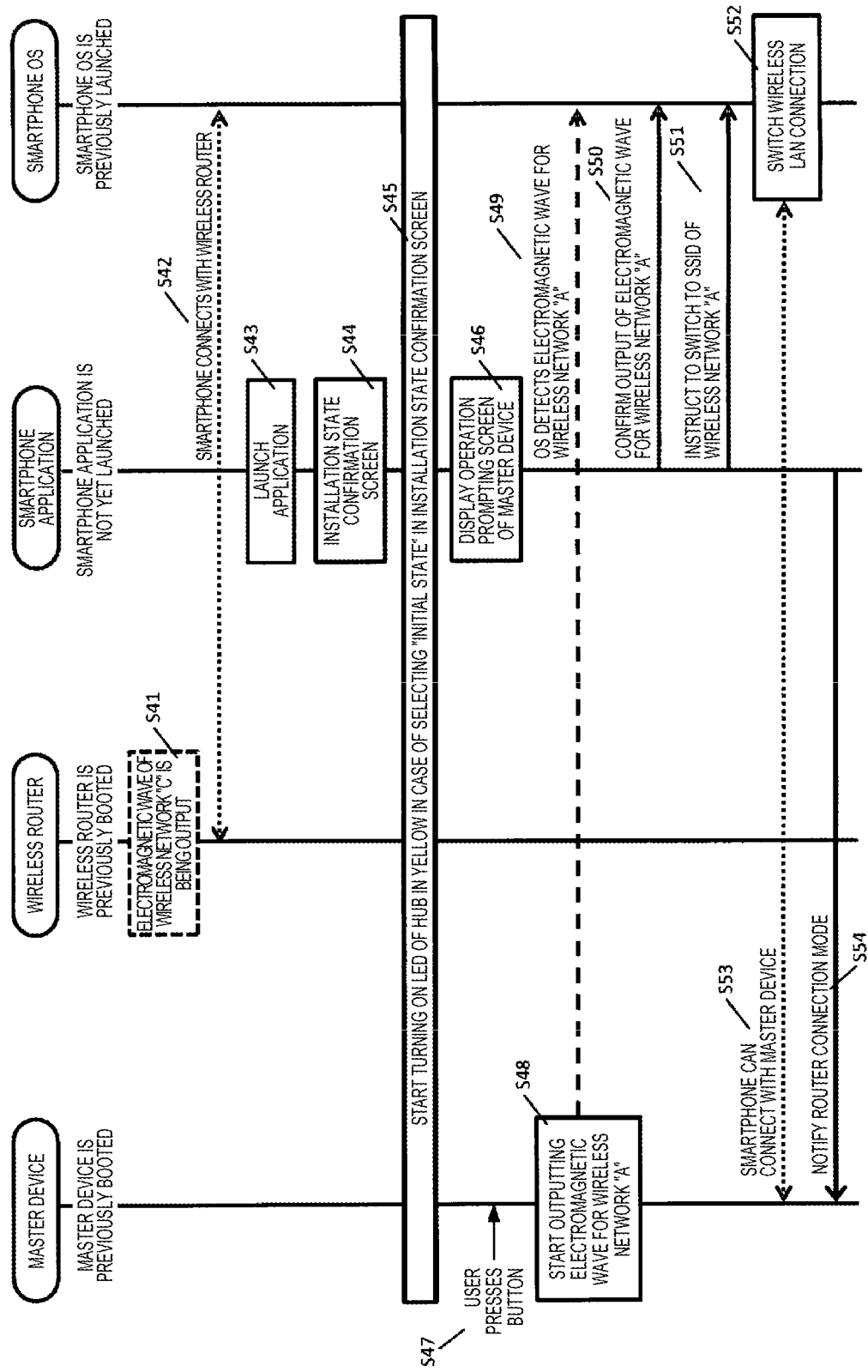
FIG. 23 is a sequence diagram illustrating operating procedures of the smartphone, a wireless router, and the master device in initial setting in the router connection mode in the first exemplary embodiment.
Figure 24:
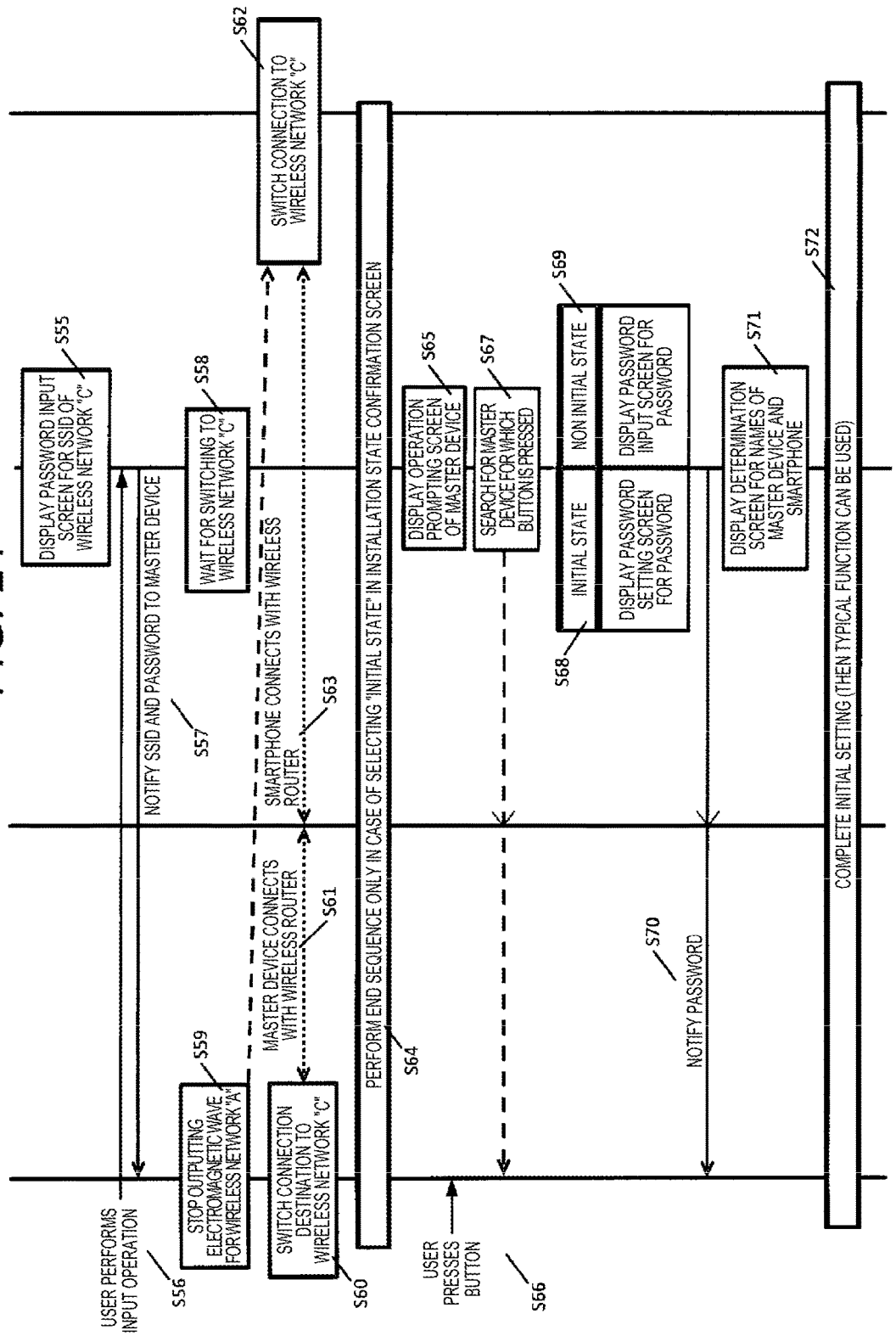
FIG. 24 is a sequence diagram illustrating operating procedures of the smartphone, the wireless router, and the master device in initial setting in the router connection mode in the first exemplary embodiment.

Next, details of initial setting performed in Step S2 of FIG. 10 will be described with reference to FIG. 11, FIG. 12, FIG. 23, and FIG. 24. FIG. 11 is a descriptive diagram illustrating one example of a summary of operation of initial setting in the router connection mode. FIG. 12 is a flowchart illustrating one example of an operating procedure for initial setting in the router connection mode in smartphone 50 of the first exemplary embodiment. FIG. 23 and FIG. 24 are sequence diagrams illustrating operating procedures of smartphone 50, wireless router 60, and master device 10 in initial setting in the router connection mode in the first exemplary embodiment.

Hereinafter, a master device may be described as a "HUB" for convenience. In FIG. 23 to FIG. 26 and FIG. 28, smartphone OS processor 506a of smartphone 50 will be described as a "smartphone OS" or simply an "OS", and smartphone application processor 506b of smartphone 50 will be described as a "smartphone application".

Various wireless networks "A", "B", and "C" used in the following description will be simply described.

The wireless network "A" is a wireless network that is used at the time of initial setting of a mode of wireless communication and that can be used by master device 10. Thus, master device 10 retains a wireless network SSID (for example, "KX_HNB600_P") in SSID list retainer 109a.

The wireless network "B" is a wireless network that is used at the time of actual operation in the soft AP mode after initial setting of a mode of wireless communication and that can be used by each master device 10. Similarly, master device 10 retains a wireless network SSID (for example, "KX_HNB600_111111") in SSID list retainer 109a. The part "111111" is, for example, a media access control (MAC) address of master device 10 and is information that can identify master device 10. That is, in the case of master device 10 being disposed in plural numbers in home interior monitoring system 5, a common SSID is given to all master devices 10 for the wireless network "A", and a unique SSID is given to each master device 10 for the wireless network "B". Accordingly, even in the case of master device 10 being disposed in plural numbers in home interior monitoring system 5, initial setting of a mode of wireless communication between smartphone 50 and master devices 10 can be correctly performed, and degradation of security can be reduced without generation of a crosstalk at the time of actual operation.

The wireless network C is a wireless network that is used in the router connection mode at the time of initial setting of a mode of wireless communication and at the time of actual operation and that can be used by wireless router 60. Thus, smartphone 50 that can connect to wireless router 60 at the start of initial setting retains an SSID of the wireless network "C" in SSID list retainer 506c.

As illustrated in FIG. 11 and FIG. 23, an assumption of initial setting in the router connection mode is that master device 10, wireless router 60, and smartphone OS processor 506a are previously booted and that smartphone application processor 506b is not yet booted. In addition, wireless router 60 as a connection destination of wireless communication in the router connection mode is not registered in master device 10.

As illustrated in FIG. 23, wireless router 60 is outputting an electromagnetic wave for the wireless network "C" that uses the wireless LAN used in the router connection mode (S41), and smartphone 50 wirelessly connects with wireless router 60 (S42) and thus can receive the electromagnetic wave for the wireless network "C".

In FIG. 12 and FIG. 23, when a tap operation is performed on display/console 503 by a user operation for an icon (not illustrated) of a home network application that can be used in home interior monitoring system 5 of the present exemplary embodiment, smartphone 50 launches the home network application (S43). Smartphone 50 displays an installation state confirmation screen (refer to FIG. 13) of master device 10 on display/console 503 in order to prompt the user to register a connection destination of wireless communication of master device 10 (S11 and S44).

Figure 13:
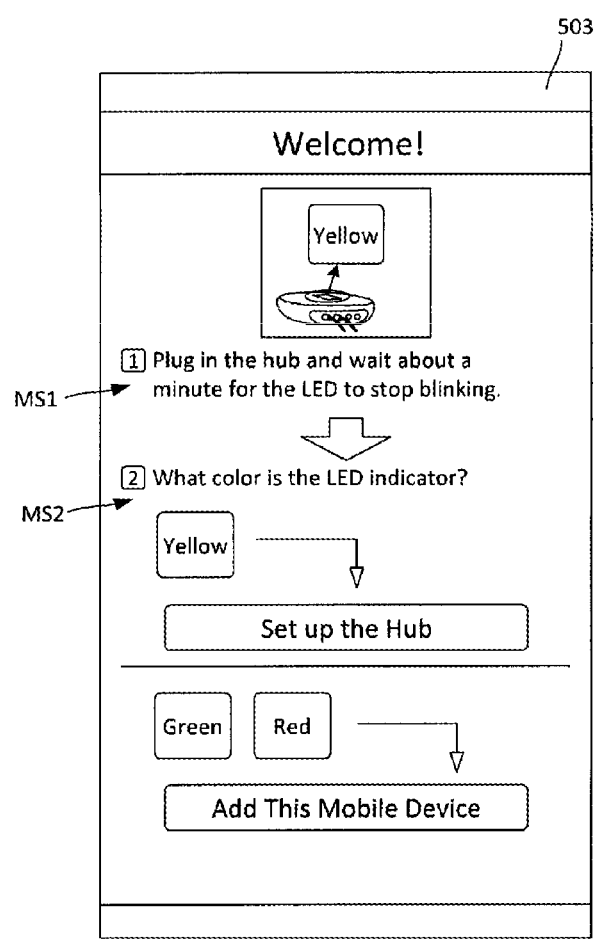
FIG. 13 is a diagram illustrating a display example of an installation state confirmation screen of the master device.

FIG. 13 is a diagram illustrating a display example of the installation state confirmation screen of master device 10. Message MS1 and message MS2 are displayed in the installation state confirmation screen of master device 10 illustrated in FIG. 13. Message MS1 is for prompting the user to plug in master device 10 and then instructing the user to wait until blinking of an LED of master device 10 stops. Message MS2 is for indicating a button to be pressed according to the color of the LED of master device 10 that is turned on after blinking of the LED of master device 10 stops. The color of the LED turned on is determined by master device 10 according to whether or not a connection destination of wireless communication is registered. Turning on of the LED in yellow indicates that a connection destination of master device 10 is not yet registered, and turning on of the LED in green or red indicates that a connection destination of master device 10 is previously registered.

When the user visually recognizes the LED turned on in green or red and consequently a button "Add This Mobile Device" corresponding to green or red is pressed on display/console 503, the process of smartphone 50 proceeds to Step S20 since a connection destination of wireless communication in the router connection mode is previously registered in master device 10 (NO in S12).

Meanwhile, when the user visually recognizes the LED turned on in yellow and consequently a button "Set up the Hub" corresponding to yellow is pressed on display/console 503 (S45), the process of smartphone 50 proceeds to Step S13 since a connection destination of wireless communication in the router connection mode is not yet registered in master device 10 (YES in S12). That is, smartphone 50 displays an operation prompting screen (refer to FIG. 14) of master device 10 on display/console 503 (S13 and S46) in order to prompt the user to output (emit) an electromagnetic wave of the wireless LAN (for example, Wifi (registered trademark)) to master device 10.

Figure 14:
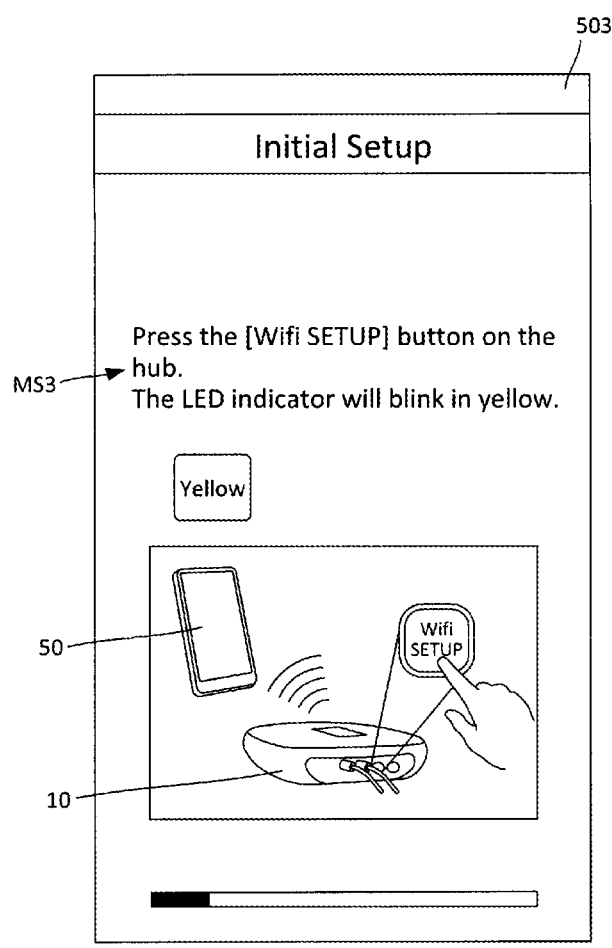
FIG. 14 is a diagram illustrating a display example of an operation prompting screen of the master device at the time of initial setting in the router connection mode.

FIG. 14 is a diagram illustrating a display example of the operation prompting screen of master device 10 at the time of initial setting in the router connection mode. Message MS3 is displayed in the operation prompting screen illustrated in FIG. 14. Message MS3 is for prompting the user to press a button "Wifi SETUP" disposed on console 105 of master device 10 and indicating that the LED of master device 10 will blink in yellow by the press. The LED of master device 10 blinking in yellow indicates a state of outputting an electromagnetic wave for the wireless network "A".

When the button "Wifi SETUP" of master device 10 is pressed by a user operation (S47), the LED of master device 10 blinks in yellow, and then master device 10 outputs (emits) an electromagnetic wave for the Wifi (registered trademark) wireless network "A" (S48).

Smartphone 50, when receiving the electromagnetic wave for the wireless network "A" output from master device 10, detects the electromagnetic wave for the wireless network "A" in smartphone OS processor 506a (S49). Smartphone 50, in smartphone application processor 506b, confirms the output of the electromagnetic wave for the wireless network "A" from master device 10 based on the detection of smartphone OS processor 506a (S50). Smartphone application processor 506b in smartphone 50 instructs smartphone OS processor 506a to switch the connection destination of the wireless LAN to the SSID corresponding to the wireless network "A" (S51). Smartphone 50, in smartphone OS processor 506a, changes the connection destination of the wireless LAN from the currently connecting connection destination in the wireless network "C" (that is, wireless router 60) to the connection destination in the wireless network "A" (that is, master device 10) and wirelessly connects to the changed connection destination (S14 and S52). Accordingly, master device 10 and smartphone 50 can temporarily wirelessly communicate directly with each other (S53).

Smartphone 50, after changing the connection destination in Step S14, directly sends, from smartphone application processor 506b to master device 10, a message indicating that smartphone 50 will wirelessly connect and wirelessly communicate in the router connection mode (S15 and S54). The reason why the router connection mode is used is that, as described with reference to FIG. 10, smartphone 50 is connected to any wireless network (specifically, a wireless router) of the wireless LAN at the start of initial setting of registration of a connection destination of wireless communication of master device 10.

Smartphone 50, since retaining the SSID of the wireless network "C" used in the router connection mode, displays a password input screen (refer to FIG. 15) for a password (connection password) of the SSID on display/console 503 (S16 and S55).

Figure 15:
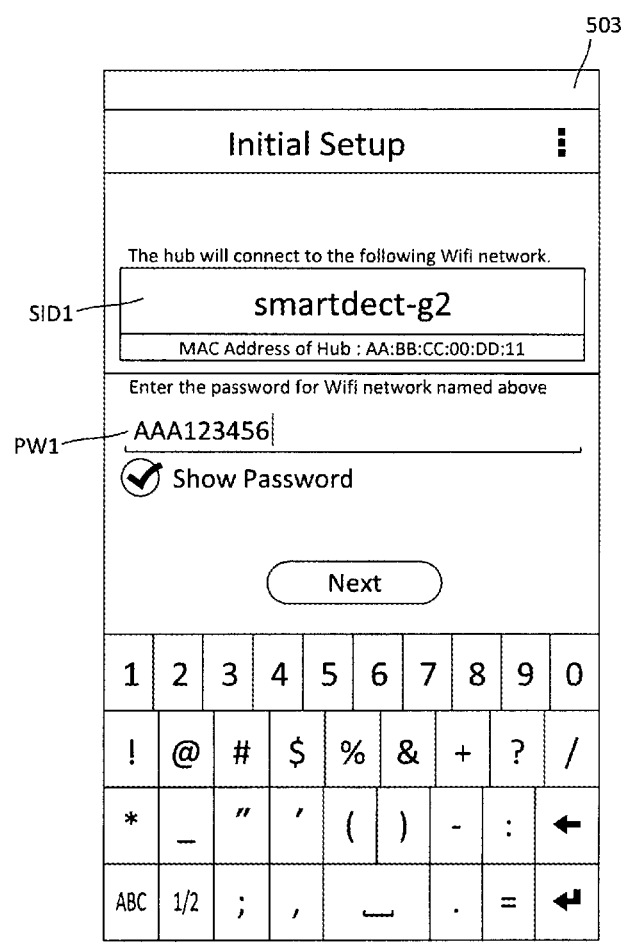
FIG. 15 is a diagram illustrating a display example of a password setting screen for a password of an SSID in the router connection mode.

FIG. 15 is a diagram illustrating a display example of a password setting screen for a password of an SSID in the router connection mode. SSID display region SID1 and input region PW1 are displayed in the password setting screen illustrated in FIG. 15. SSID display region SID1 indicates that "smartdect-g2" will be used as an SSID at the time of master device 10 using the wireless network "C" of the wireless LAN (for example, Wifi (registered trademark)). Input region PW1 is for setting a password (connection password) corresponding to the SSID "smartdect-g2". The word "smartdect-g2" is the SSID of wireless router 60 for relaying when master device 10 and smartphone 50 wirelessly communicate in the router connection mode.

Smartphone 50, when "AAA123456" is input by a user operation in input region PW1 of the password setting screen illustrated in FIG. 15 and then a button "NEXT" is pressed (S56), stores the SSID (that is, "smartdect-g2") displayed in the password setting screen and the input password (that is, "AAA123456") in storage 504 as setting information related to the connection destination of master device 10 and sends the SSID and the password to master device 10 (S17 and S57).

Smartphone 50, after sending the SSID and the password to master device 10, waits until master device 10 completes connection switching from the wireless network "A" to the wireless network "C", while displaying a waiting screen (refer to FIG. 16) for completion of switching of wireless connection of master device 10 on display/console 503 (S18 and S58).

Figure 16:
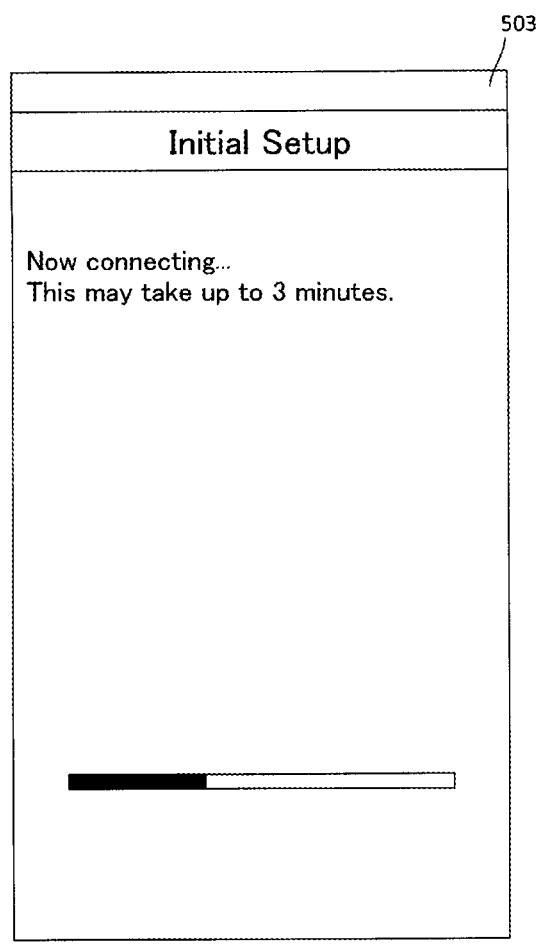
FIG. 16 is a diagram illustrating a display example of a waiting screen for completion of switching of wireless connection of the master device in the router connection mode or for completion of rebooting of the master device in the soft AP mode.

FIG. 16 is a diagram illustrating a display example of the waiting screen for completion of switching of wireless connection of master device 10. The waiting screen illustrated in FIG. 16 indicates that it takes maximum 3 minutes until master device 10 completes connection switching from the wireless network "A" to the wireless network "C". 3 minutes are one example, and apparently there may be a slight increase or decrease according to the status of connection.

Master device 10, when receiving the SSID and the password sent from smartphone 50 in Step S57, registers, as a connection destination of wireless communication in the router connection mode, wireless router 60 that is specified by the SSID and the password and is used in the wireless network "C". Accordingly, master device 10 stops outputting (emitting) the electromagnetic wave for the wireless network "A" (S59) and, since the connection destination of wireless communication is switched to wireless router 60 of the wireless network "C" (S60), can wirelessly connect with wireless router 60 (S61).

Smartphone 50 does not receive the electromagnetic wave for the wireless network "A" when master device 10 completes connection switching from the wireless network "A" to the wireless network "C". Thus, smartphone 50, when not receiving the electromagnetic wave for a certain amount of time, returns the connection destination of wireless communication from the currently connecting connection destination in the wireless network "A" (that is, master device 10) to the connection destination in the wireless network "C" (that is, wireless router 60) while displaying a searching screen (refer to FIG. 17) of master device 10 on display/console 503 (S19 and S62). Accordingly, smartphone 50 can wirelessly connect with wireless router 60 (S63) since the connection destination of wireless communication is switched to wireless router 60 in the wireless network "C". As described heretofore, in the router connection mode, a connection destination of wireless communication of master device 10 is registered, and initial setting (setup) of master device 10 is completed (S64).

Figure 17:
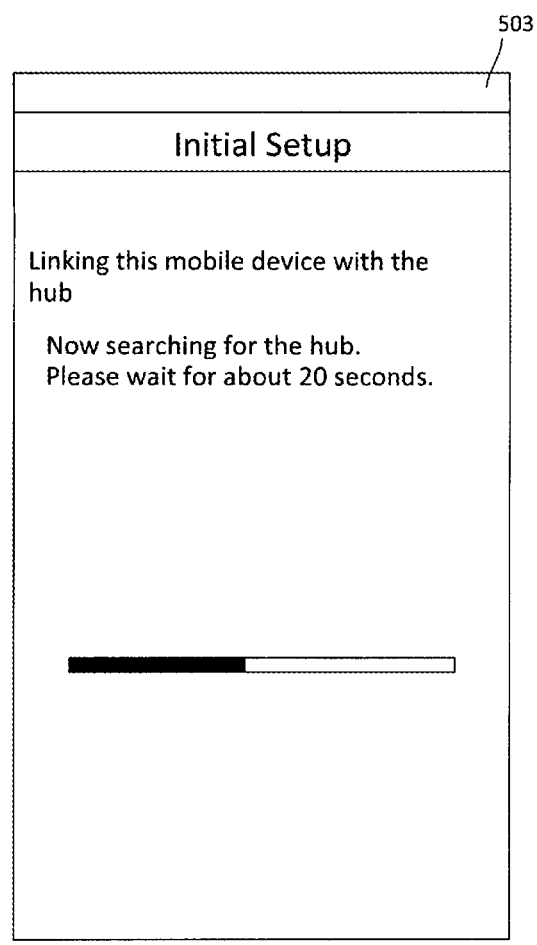
FIG. 17 is a diagram illustrating a display example of a searching screen of the master device.

FIG. 17 is a diagram illustrating a display example of the searching screen of master device 10. The searching screen illustrated in FIG. 17 indicates that smartphone 50 searches for a master device (specifically, master device 10) that is wirelessly connectable through wireless router 60 and that it takes approximately 20 seconds to complete the search. 20 seconds are one example, and apparently there may be a slight increase or decrease according to the status of connection.

Smartphone 50 displays an operation prompting screen (refer to FIG. 18) of master device 10 on display/console 503 after Step S19 (S20 and S65). The reason why the operation prompting screen of master device 10 is displayed on smartphone 50 (in other words, the reason why the user is caused to press the button "Wifi SETUP" of master device 10) is that a signal for identifying a master device is emitted to corresponding master device 10 via wireless router 60 in order to specify a master device to be connected with smartphone 50 even if master device 10 connected to wireless router 60 is in plural numbers.

Figure 18:
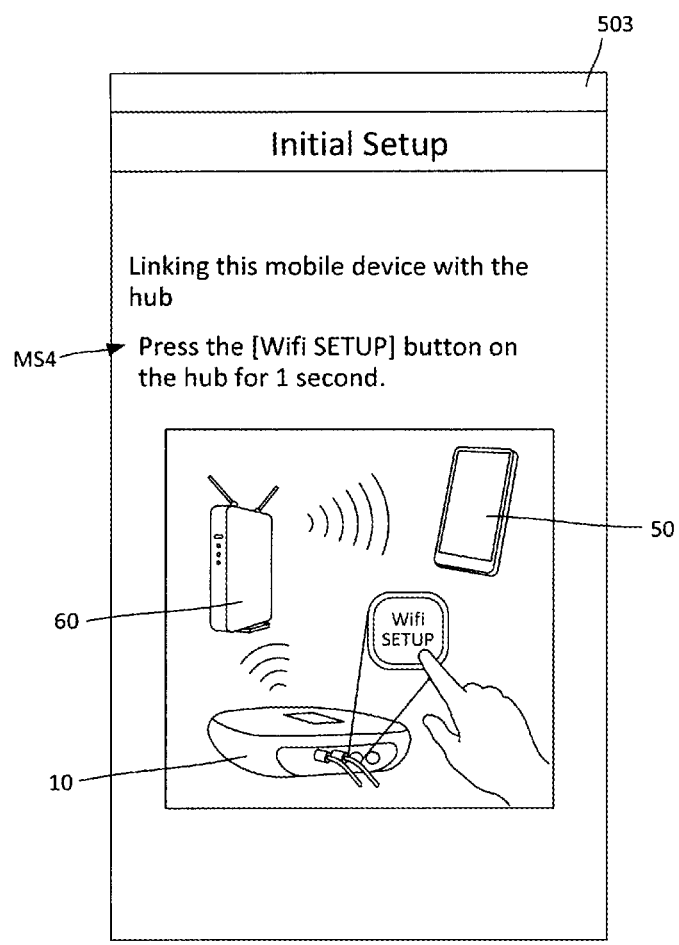
FIG. 18 is a diagram illustrating a display example of the operation prompting screen of the master device after a connection destination of wireless communication of the master device is registered in the router connection mode.

FIG. 18 is a diagram illustrating a display example of the operation prompting screen of master device 10 after a connection destination of wireless communication of master device 10 is registered in the router connection mode. Message MS4 is displayed in the operation prompting screen illustrated in FIG. 18. Message MS4 is for prompting the user to press the button "Wifi SETUP" disposed on console 105 of master device 10 for 1 second. Unlike the operation prompting screen illustrated in FIG. 14, the operation prompting screen illustrated in FIG. 18 illustrates wireless router 60 between master device 10 and smartphone 50 since a connection destination of wireless communication of master device 10 is previously registered in the router connection mode.

Even if a plurality of master devices is wirelessly connected to wireless router 60, when the button "Wifi SETUP" is pressed by a user operation (S66), a master device on which the button "Wifi SETUP" is pressed sends a signal for identification of the master device (a signal for master device identification) to wireless router 60. Wireless router 60 receives the signal for master device identification sent from the master device. Smartphone 50 searches for, through wireless router 60, master device 10 on which the user presses the button "Wifi SETUP" (in other words, a master device that sends the above signal for master device identification) (S21 and S67). Accordingly, even if a plurality of master devices is wirelessly connected to wireless router 60, smartphone 50 can wirelessly connect with target master device 10 through wireless router 60 in the router connection mode and thus can also wirelessly communicate with master device 10.

Smartphone 50, after being capable of wirelessly connecting with master device 10 through wireless router 60, displays, on display/console 503, a password setting screen or a password input screen (refer to FIG. 19) for a login password for a login to master device 10 (S22). Smartphone 50, in the case of, for example, a login password set by a user operation not being registered (that is, in the initial state) (S68), displays the password setting screen illustrated in FIG. 19 on display/console 503. Meanwhile, smartphone 50, in the case of, for example, a login password set by a user operation being registered (that is, in a state that is not the initial state) (S69), displays the password input screen illustrated in FIG. 19 on display/console 503.

Figure 19:
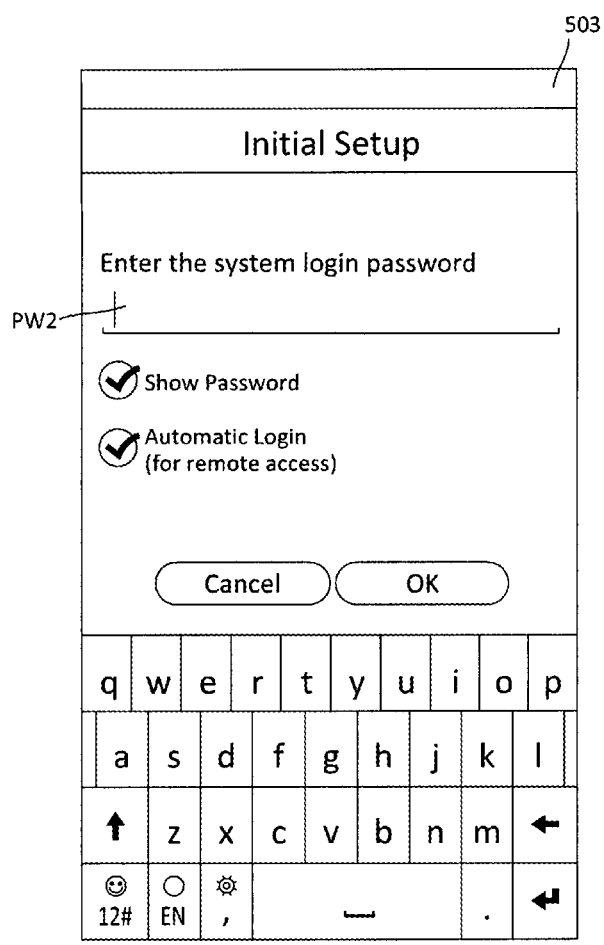
FIG. 19 is a diagram illustrating a display example of a password setting screen or a password input screen for a login password for a login to the master device in the router connection mode or the soft AP mode.

FIG. 19 is a diagram illustrating a display example of a password setting screen or a password input screen for a login password for a login to master device 10 in the router connection mode or the soft AP mode. Input region PW2 is displayed in the password setting screen illustrated in FIG. 19. Input region PW2 is for setting a login password for a login of smartphone 50 to master device 10. When a login password is input in input region PW2 and a button OK is pressed by a user operation, smartphone 50 registers and stores a login password for allowing a login of smartphone 50 to master device 10 and sends and notifies the login password to master device 10 (S70). Master device 10 stores the login password sent from smartphone 50. The login password is stored in, for example, storage 504 of smartphone 50 and is also stored in storage 103 of master device 10.

Smartphone 50 displays, on display/console 503, a name setting screen (refer to FIG. 20) for setting names of master device 10 and smartphone 50 (S23 and S71).

Figure 20:
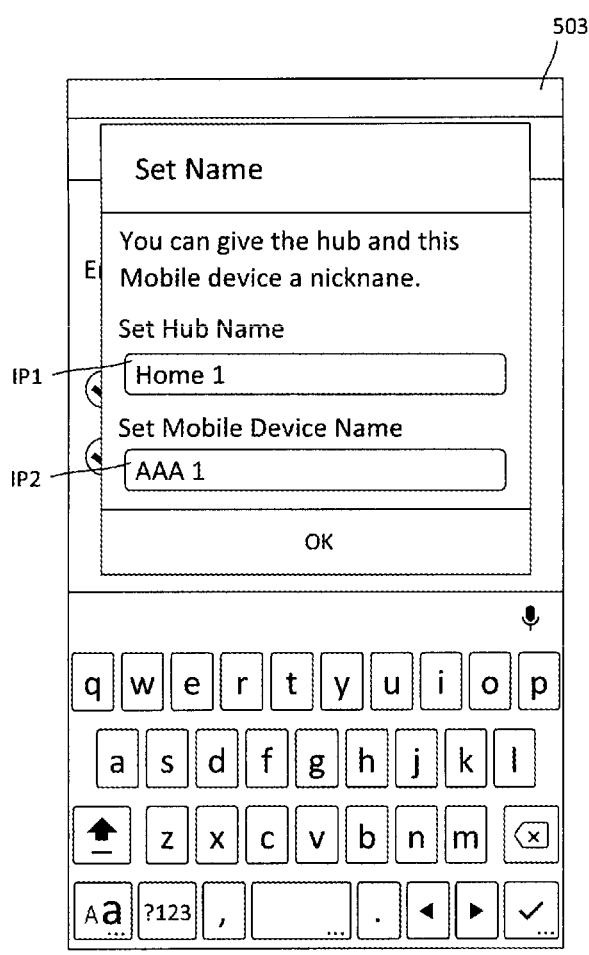
FIG. 20 is a diagram illustrating a display example of a name setting screen for setting names of the master device and the smartphone.

FIG. 20 is a diagram illustrating a display example of a name setting screen for setting names of master device 10 and smartphone 50. Name input region IP1 and name input region IP2 are displayed in the name setting screen illustrated in FIG. 20. Name input region IP1 is for inputting a name of master device 10 that is a wireless communication target of smartphone 50 in the router connection mode. Name input region IP2 is for inputting a name of smartphone 50. When a name of master device 10 (for example, "Home 1") is input in name input region IP1 and a name of smartphone 50 (for example, "AAA 1") in name input region IP2 and a button OK is pressed by a user operation, smartphone 50 associates and registers each name of master device 10 and smartphone 50. Each name of master device 10 and smartphone 50 is stored in, for example, storage 504. Accordingly, registration (that is, initial setting) of a connection destination of wireless communication of master device 10 is finished in the router connection mode (S72), and a typical home network application can be used after initial setting.

Initial Setting in Soft AP Mode

Figure 21:
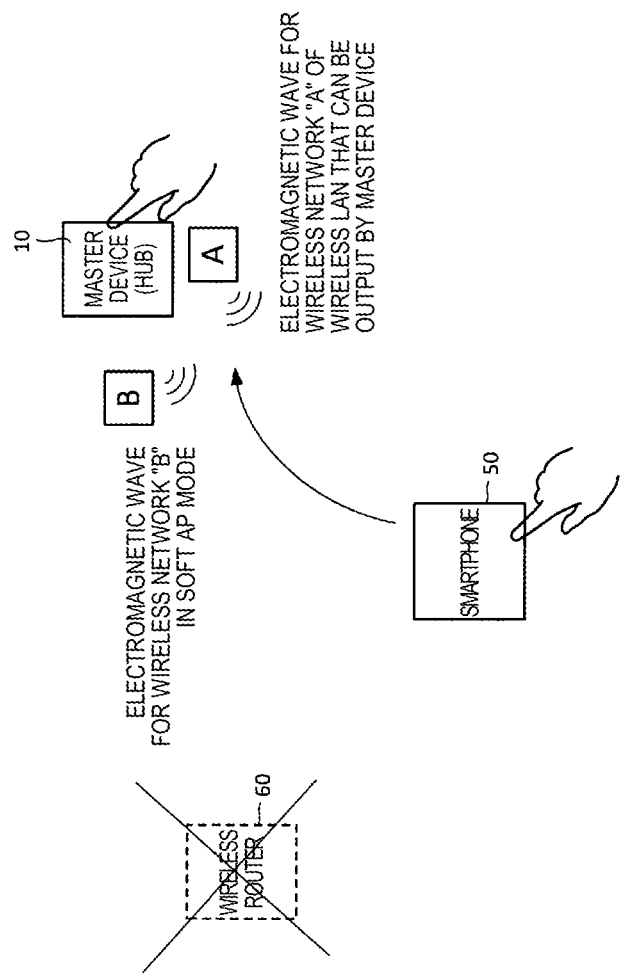
FIG. 21 is a descriptive diagram illustrating one example of a summary of operation of initial setting in the soft AP mode.
Figure 22:
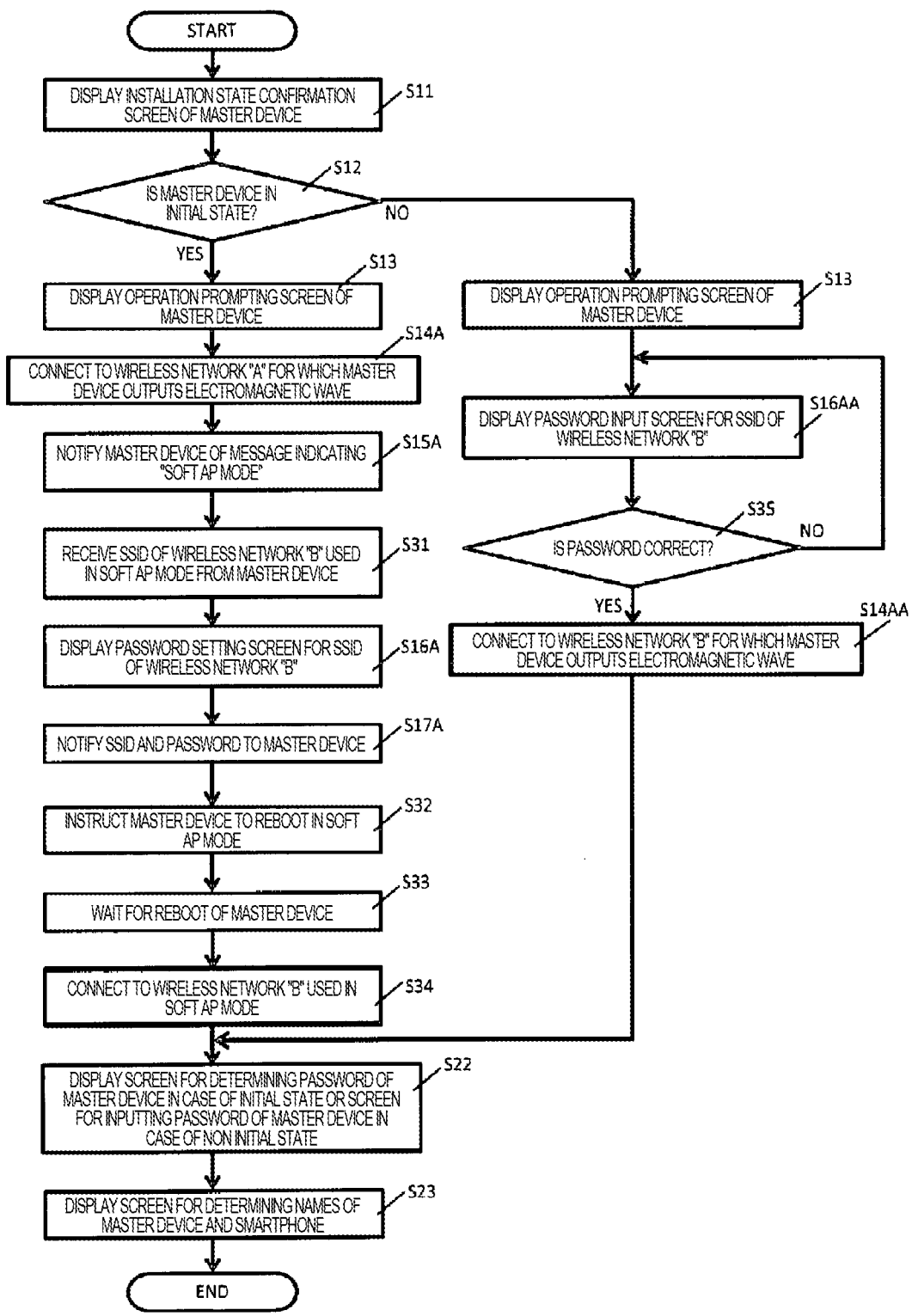
FIG. 22 is a flowchart illustrating one example of an operating procedure for initial setting in the soft AP mode in the smartphone of the first exemplary embodiment.
Figure 25:
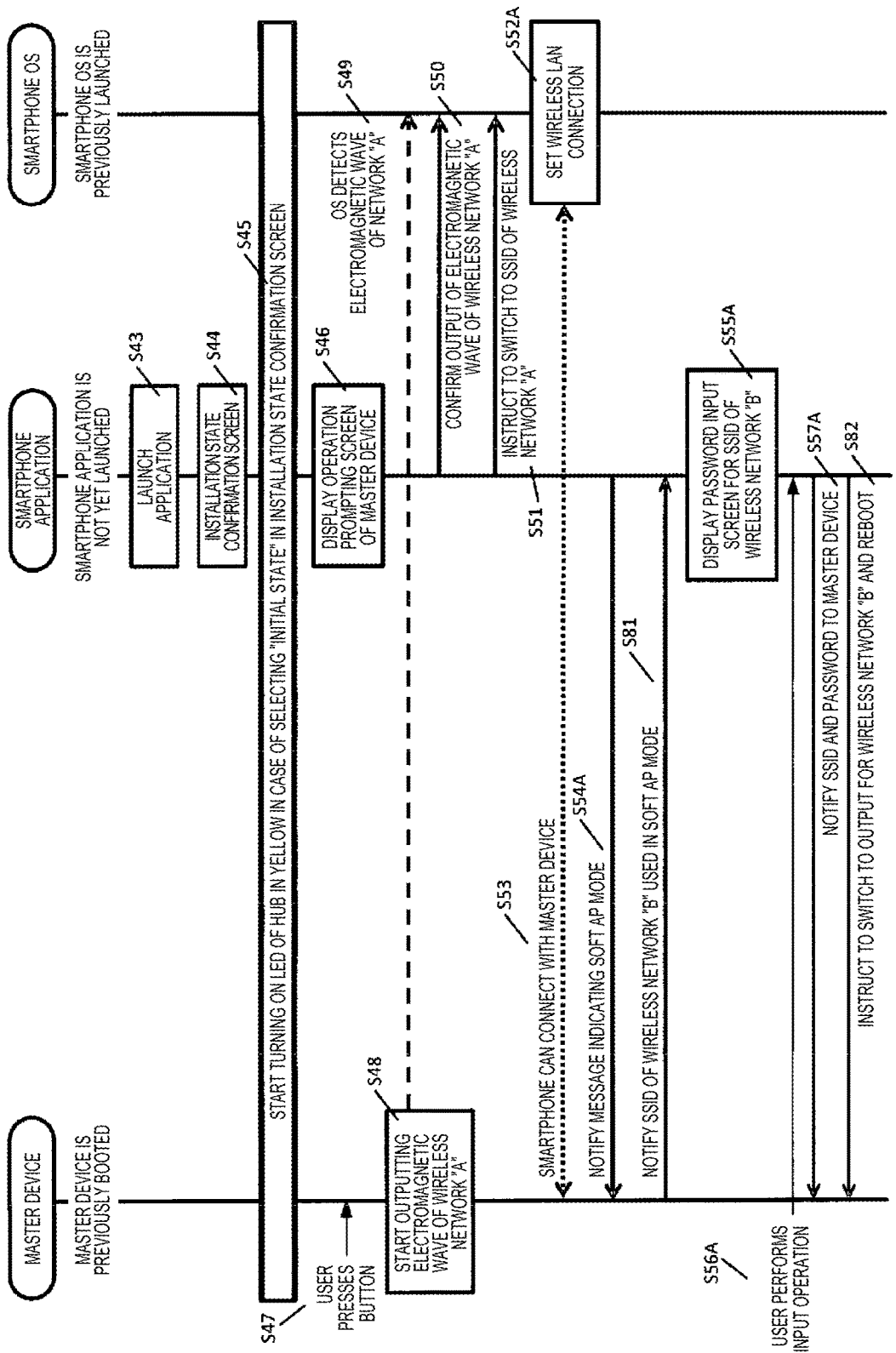
FIG. 25 is a sequence diagram illustrating operating procedures of the smartphone and the master device in initial setting in the soft AP mode in the first exemplary embodiment.
Figure 26:
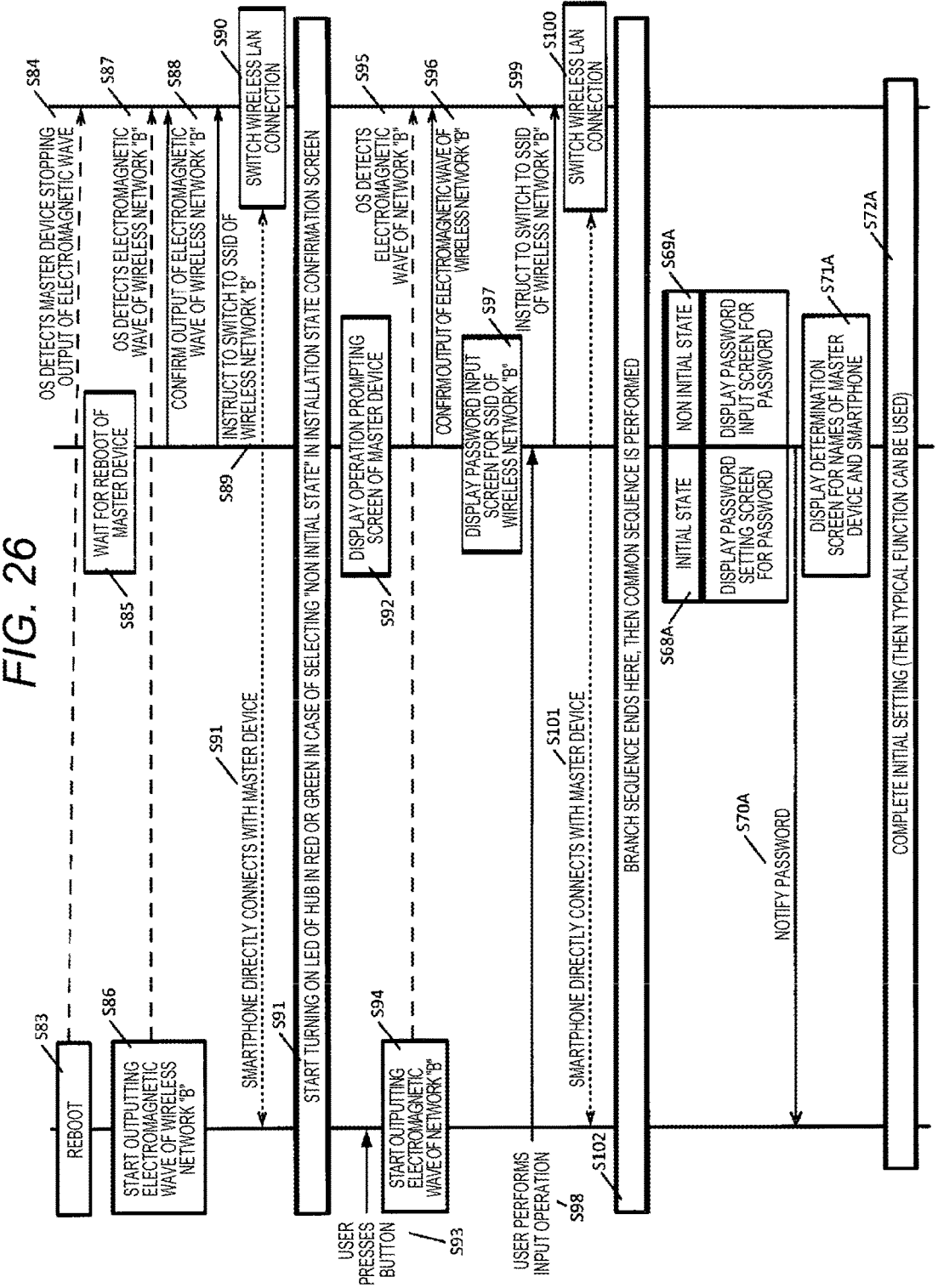
FIG. 26 is a sequence diagram illustrating operating procedures of the smartphone and the master device in initial setting in the soft AP mode in the first exemplary embodiment.

Next, details of initial setting performed in Step S3 of FIG. 10 will be described with reference to FIG. 21, FIG. 22, FIG. 25, and FIG. 26. FIG. 21 is a descriptive diagram illustrating one example of a summary of operation of initial setting in the soft AP mode. FIG. 22 is a flowchart illustrating one example of an operating procedure for initial setting in the soft AP mode in smartphone 50 of the first exemplary embodiment. FIG. 25 and FIG. 26 are sequence diagrams illustrating operating procedures of smartphone 50 and master device 10 in initial setting in the soft AP mode in the first exemplary embodiment. In FIG. 22, FIG. 25, and FIG. 26, processes that are the same as the corresponding processes in FIG. 12, FIG. 23, and FIG. 24 will be designated by the same step numbers, and description thereof will be simplified or omitted. Different contents will be described.

As illustrated in FIG. 21 and FIG. 25, an assumption of initial setting in the soft AP mode is that master device 10 and smartphone OS processor 506a are previously booted and that smartphone application processor 506b is not yet booted. In addition, at the start of initial setting of the soft AP mode, a password corresponding to the SSID of the wireless network "B" used between master device 10 and smartphone 50 as a connection destination of wireless communication in the soft AP mode is not registered in master device 10.

In FIG. 22 and FIG. 25, smartphone 50 launches the home network application (S43). Smartphone 50 displays the installation state confirmation screen (refer to FIG. 13) of master device 10 on display/console 503 in order to prompt the user to register a connection destination of wireless communication of master device 10 (S11 and S44).

When the user visually recognizes the LED turned on in green or red and consequently the button "Add This Mobile Device" corresponding to green or red is pressed on display/console 503, the process of smartphone 50 proceeds to Step S13 since a connection destination of wireless communication in the soft AP mode is previously registered in master device 10 (NO in S12).

Meanwhile, when the user visually recognizes the LED turned on in yellow and consequently the button "Set up the Hub" corresponding to yellow is pressed on display/console 503 (S45), the process of smartphone 50 proceeds to Step S13 since a connection destination of wireless communication in the soft AP mode is not yet registered in master device 10 (YES in S12). That is, smartphone 50 displays the operation prompting screen (refer to FIG. 14) of master device 10 on display/console 503 (S13 and S46) in order to prompt the user to output (emit) an electromagnetic wave of the wireless LAN (for example, Wifi (registered trademark)) to master device 10.

When the button "Wifi SETUP" of master device 10 is pressed by a user operation (S47), the LED of master device 10 blinks in yellow, and then master device 10 outputs (emits) an electromagnetic wave for the Wifi (registered trademark) wireless network "A" (S48). Smartphone 50, when receiving the electromagnetic wave for the wireless network "A" output from master device 10, detects the electromagnetic wave for the wireless network "A" in smartphone OS processor 506a (S49). Smartphone 50, in smartphone application processor 506b, confirms the output of the electromagnetic wave for the wireless network "A" from master device 10 based on the detection of smartphone OS processor 506a (S50). Smartphone application processor 506b in smartphone 50 instructs smartphone OS processor 506a to switch the connection destination of the wireless LAN to the SSID corresponding to the wireless network "A" (S51). Smartphone 50, in smartphone OS processor 506a, sets the connection destination of the wireless LAN to the connection destination in the wireless network "A" (that is, master device 10) and wirelessly connects to the set connection destination (S14A and S52A). Accordingly, master device 10 and smartphone 50 can wirelessly communicate directly with each other (S53).

Smartphone 50, after setting the connection destination in Step S14A, directly sends, from smartphone application processor 506b to master device 10, a message indicating that smartphone 50 will wirelessly connect and wirelessly communicate in the soft AP mode (515A and 554A). The reason why the soft AP mode is used is that, as described with reference to FIG. 10, smartphone 50 is not connected to any wireless network (specifically, a wireless router) of the wireless LAN at the start of initial setting of registration of a connection destination of wireless communication of master device 10.

Master device 10, when receiving the message indicating wireless connection and wireless communication in the soft AP mode, acquires the SSID of the wireless network "B" used at the time of wireless connection and wireless communication in the soft AP mode from SSID list retainer 109a and notifies the SSID to smartphone 50 (S81).

Smartphone 50, when receiving the SSID of the wireless network "B" sent from master device 10 (S31), displays a password setting screen (refer to FIG. 27) for a password (connection password) of the received SSID on display/console 503 (S16A and S55A).

Figure 27:
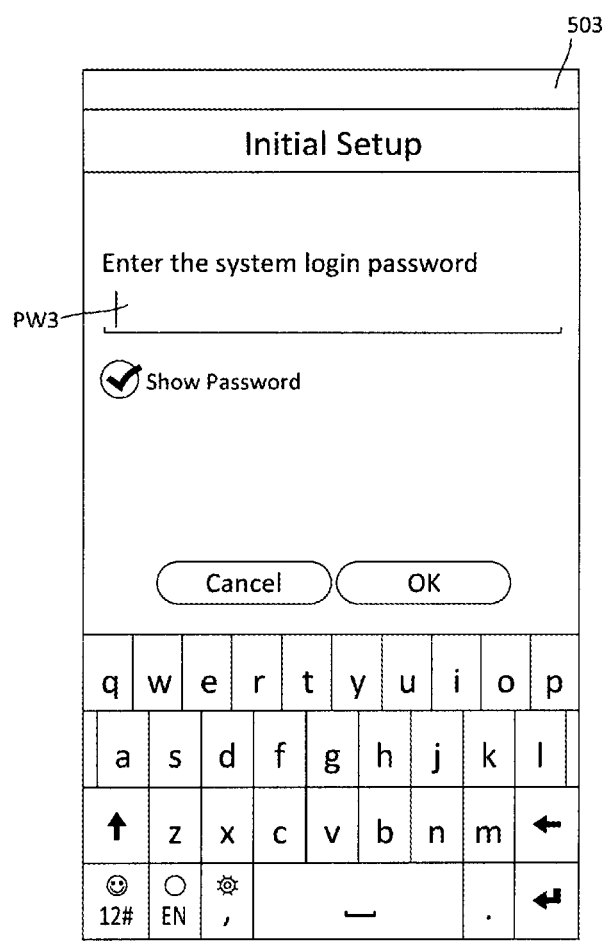
FIG. 27 is a diagram illustrating a display example of the password setting screen for a password of an SSID in the soft AP mode.

FIG. 27 is a diagram illustrating a display example of the password setting screen for a password of an SSID in the soft AP mode. Input region PW3 is displayed in the password setting screen illustrated in FIG. 27. Input region PW3 is for setting a password (connection password) corresponding to the SSID of the wireless network "B" that is notified from master device 10 and is used in the soft AP mode.

Smartphone 50, when, for example, "AAA123456" is input by a user operation in input region PW3 of the password setting screen illustrated in FIG. 27 and then a button "OK" is pressed (S56A), stores the SSID of the wireless network "B" and the input password in storage 504 as setting information related to the connection destination of master device 10 and sends the SSID and the password to master device 10 (S17A and S57A).

Smartphone 50, after sending the SSID and the password to master device 10, instructs master device 10 to reboot in order to switch output to an electromagnetic wave for the wireless network "B" (S32 and S82) and waits for completion of the reboot of master device 10 while displaying the waiting screen (refer to FIG. 16) for completion of the reboot of master device 10 on display/console 503 (S33).

The waiting screen illustrated in FIG. 16 indicates that it takes maximum 3 minutes until master device 10 completes a reboot for connection switching from the wireless network "A" to the wireless network "B". 3 minutes are one example, and apparently there may be a slight increase or decrease according to the status of connection.

Master device 10, when receiving a reboot instruction sent from smartphone 50 in Step S82, reboots in order to switch output from the currently outputting wireless network "A" to the wireless network "B" (S83). Accordingly, master device 10 registers a password corresponding to the SSID notified in Step S57A as setting information related to smartphone 50 as a connection destination of wireless communication in the soft AP mode. Master device 10 stops outputting (emitting) the electromagnetic wave for the wireless network "A" due to the reboot thereof.

When master device 10 stops outputting (emitting) the electromagnetic wave for the wireless network "A" due to the reboot thereof, smartphone 50 does not receive the electromagnetic wave for a certain amount of time and thus detects a stoppage of output of the electromagnetic wave for the wireless network "A" (S84). At this point, smartphone 50 cannot detect completion of the reboot of master device 10 and thus waits until being capable of detecting completion of the reboot of master device 10 (S85).

Master device 10 starts outputting (emitting) an electromagnetic wave for the wireless network "B" due to the reboot thereof (S86).

Smartphone 50, in smartphone OS processor 506a, detects the electromagnetic wave for the wireless network "B" output from master device 10 (S87). Smartphone 50, in smartphone application processor 506b, confirms the output of the electromagnetic wave for the wireless network "B" from master device 10 based on the detection of smartphone OS processor 506a (S88). Smartphone application processor 506b in smartphone 50 instructs smartphone OS processor 506a to switch the connection destination of the wireless LAN to the SSID corresponding to the wireless network "B" (S89). Smartphone 50, in smartphone OS processor 506a, sets the connection destination of the wireless LAN to the currently connecting connection destination in the wireless network "B" (that is, master device 10) and wirelessly connects to the set connection destination (S34 and S90). Accordingly, master device 10 and smartphone 50 can wirelessly communicate directly with each other by the soft AP mode. In the soft AP mode, a password corresponding to the SSID of the wireless network "B" that is used by master device 10 as a connection destination of wireless communication with smartphone 50 is registered as setting information related to smartphone 50, and initial setting (setup) of master device 10 is completed (S91).

If registration (that is, initial setting) of a connection destination of wireless communication of master device 10 is finished in the soft AP mode (NO in S12), smartphone 50 displays the operation prompting screen (refer to FIG. 14) of master device 10 on display/console 503 (S13 and S92) in order to prompt the user to output (emit) an electromagnetic wave of the wireless LAN (for example, Wifi (registered trademark)) to master device 10.

When the button "Wifi SETUP" of master device 10 is pressed by a user operation (S93), the LED of master device 10 blinks in yellow, and then master device 10 outputs (emits) an electromagnetic wave for the Wifi (registered trademark) wireless network "B" (S94). Smartphone 50, when receiving the electromagnetic wave for the wireless network "B" output from master device 10, detects the electromagnetic wave for the wireless network "B" in smartphone OS processor 506a (S95). Smartphone 50, in smartphone application processor 506b, confirms the output of the electromagnetic wave for the wireless network "B" from master device 10 based on the detection of smartphone OS processor 506a (S96).

Smartphone 50 displays a password input screen (refer to FIG. 27) for a password (connection password) of the SSID of the wireless network "B" on display/console 503 (S16AA and S97). When a password is input in the password input screen by a user operation (S98), smartphone 50 determines whether or not the input password is correct (S35). Only in the case of input of a correct password (YES in S35), smartphone 50, in smartphone application processor 506b, instructs smartphone OS processor 506a to switch the connection destination of the wireless LAN to the SSID corresponding to the wireless network "B" (S99). Smartphone 50, in smartphone OS processor 506a, sets the connection destination of the wireless LAN to the connection destination in the wireless network "B" (that is, master device 10) and wirelessly connects to the set connection destination (S14AA and S100). Accordingly, master device 10 and smartphone 50 can wirelessly communicate directly with each other (S101).

Smartphone 50, after being capable of wirelessly connecting directly with master device 10 (S102), displays, on display/console 503, the password setting screen or the password input screen (refer to FIG. 19) for a login password for a login to master device 10 (S22). Smartphone 50, in the case of, for example, a login password set by a user operation not being registered (that is, in the initial state) (S68A), displays the password setting screen illustrated in FIG. 19 on display/console 503. Meanwhile, smartphone 50, in the case of, for example, a login password set by a user operation being registered (that is, in a state that is not the initial state) (S69A), displays the password input screen illustrated in FIG. 19 on display/console 503.

When a login password is input in input region PW2 and a button OK is pressed by a user operation, smartphone 50 registers and stores a login password for allowing a login of smartphone 50 to master device 10 and sends and notifies the login password to master device 10 (S70A). Master device 10 stores the login password sent from smartphone 50. The login password is stored in, for example, storage 504 of smartphone 50 and is also stored in storage 103 of master device 10.

Smartphone 50 displays, on display/console 503, the name setting screen (refer to FIG. 20) for setting names of master device 10 and smartphone 50 (S23 and S71A).

When a name of master device 10 (for example, "Home 1") is input in name input region IP1 and a name of smartphone 50 (for example, "AAA 1") in name input region IP2 and a button OK is pressed by a user operation, smartphone 50 associates and registers each name of master device 10 and smartphone 50. Each name of master device 10 and smartphone 50 is stored in, for example, storage 504. Accordingly, registration (that is, initial setting) of a connection destination of wireless communication of master device 10 is finished in the soft AP mode (S72A), and a typical home network application can be used after initial setting.

As described heretofore, in home interior monitoring system 5 of the present exemplary embodiment, smartphone 50, in the case of setting information related to a connection destination of master device 10 in wireless communication not being registered in master device 10, determines a mode of wireless communication with master device 10 at the start of registration setting according to whether or not wireless communication is performed through wireless router 60. Smartphone 50 acquires setting information (for example, an SSID and a password) related to a connection destination corresponding to the determined mode of wireless communication and sends a message indicating that wireless communication will be performed in the determined mode of wireless communication and sends the setting information related to the connection destination corresponding to the mode of wireless communication to master device 10. Master device 10 registers the setting information related to the connection destination sent from smartphone 50.

Accordingly, home interior monitoring system 5 can easily perform initial setting of communication between master device 10 and smartphone 50 according to a wireless connection status of smartphone 50 at the time of initial setting of communication between master device 10 and smartphone 50 regardless of the presence of wireless router 60 in wireless communication between master device 10 of a fixed phone and smartphone 50 carried by the user, and can improve convenience of the user.

Smartphone 50 determines a mode of wireless communication with master device 10 to be the router connection mode in the case of wireless connection being previously made through wireless router 60 at the start of registration setting. Smartphone 50 sends router connection information (for example, the SSID corresponding to the wireless network "C" and a password that is set in correspondence with the SSID by a user operation) of wireless router 60 as setting information related to the connection destination corresponding to the router connection mode to master device 10. Accordingly, if wireless router 60 previously exists at the start of registration setting in a situation where smartphone 50 and wireless router 60 are connected, initial setting of wireless communication between master device 10 and smartphone 50 can be performed by using wireless router 60. In addition, since both master device 10 and smartphone 50 can wirelessly connect to wireless router 60, master device 10 and smartphone 50 can connect to Internet 65, and thus smartphone 50 can connect to master device 10 inside of the home or outside of the home.

Smartphone 50 retains in advance identification information (for example, an SSID) of wireless communication in the router connection mode, displays a password setting screen corresponding to the identification information of wireless communication on display/console 503, and sends a password input in the password setting screen by a user operation to master device 10 as router connection information. Accordingly, initial setting of the router connection mode between master device 10 and smartphone 50 can be facilitated by a simple user operation performed on smartphone 50.

Smartphone 50 determines a mode of wireless communication with master device 10 to be the direct connection mode (that is, the soft AP mode) in the case of wireless connection not being made through wireless router 60 at the start of registration setting. Smartphone 50 sends, to master device 10, a message indicating that wireless communication will be performed in the soft AP mode as a mode of wireless communication. Accordingly, in a situation where wireless router 60 does not exist at the start of registration setting, wireless router 60 may not be prepared by purchase or the like, an increase in cost can be reduced, and initial setting of wireless communication between master device 10 and smartphone 50 can be performed. Master device 10 can recognize the message indicating that wireless communication will be performed with smartphone 50 in the soft AP mode.

Master device 10, when receiving the message, sent from smartphone 50, indicating that wireless communication will be performed in the soft AP mode, sends identification information (for example, an SSID) of wireless communication used in the soft AP mode to smartphone 50. Smartphone 50 displays a password setting screen corresponding to the SSID sent from master device 10 on display/console 503 and sends a password input in the password setting screen by a user operation to master device 10 as terminal connection information. Accordingly, initial setting of the soft AP mode between master device 10 and smartphone 50 can be facilitated by a simple user operation performed on smartphone 50.

Background of Second Exemplary Embodiment

In above Japanese Patent No. 5845453, disclosed is the master device directly communicating with the smartphone in the case of a wireless router not being registered in the master device, by temporarily using the master device as an access point of a wireless local area network (LAN) in order to register a wireless router in the master device.

However, the above configuration of Japanese Patent No. 5845453 assumes that after a wireless router is actually registered in the master device, data (for example, the image data from the monitoring camera) is sent and received between the master device and the smartphone through the wireless router. Thus, for example, after the image data from the monitoring camera is transferred to the master device, the master device cannot be differently used for wireless communication through the wireless router and wireless communication without passing through the wireless router when transferring the image data to the smartphone, thereby posing the problem of low convenience. If the master device and the smartphone can wirelessly communicate without the wireless router, an advantage is achieved from the viewpoint that an increase in cost can be reduced. However, if the wireless router does not exist, the smartphone cannot wirelessly connect to the master device outside of a communication range of the master device. Thus, there also is a disadvantage such that the smartphone cannot connect to the master device outside of the home (that is, the user cannot wirelessly connect the smartphone to the master device outside of the home). Therefore, when the smartphone is to be widely used, it is preferable that the smartphone wirelessly communicate with the master device by using the wireless router.

Therefore, in a second exemplary embodiment, described are examples of home interior monitoring system 5 and a wireless communication mode switching method that switch, according to the purpose of the user, from the soft AP mode for direct connection between master device 10 and smartphone 50 to the router connection mode for connection between master device 10 and smartphone 50 through wireless router 60, and thus smartphone 50 can be widely used, and convenience of the user is improved.

Second Exemplary Embodiment

An internal configuration of home interior monitoring system 5 of the second exemplary embodiment is the same as the internal configuration of home interior monitoring system 5 of the first exemplary embodiment. Thus, description of the same contents will be simplified or omitted, and different contents will be described.

Change from Soft AP Mode to Router Connection Mode

Figure 28:
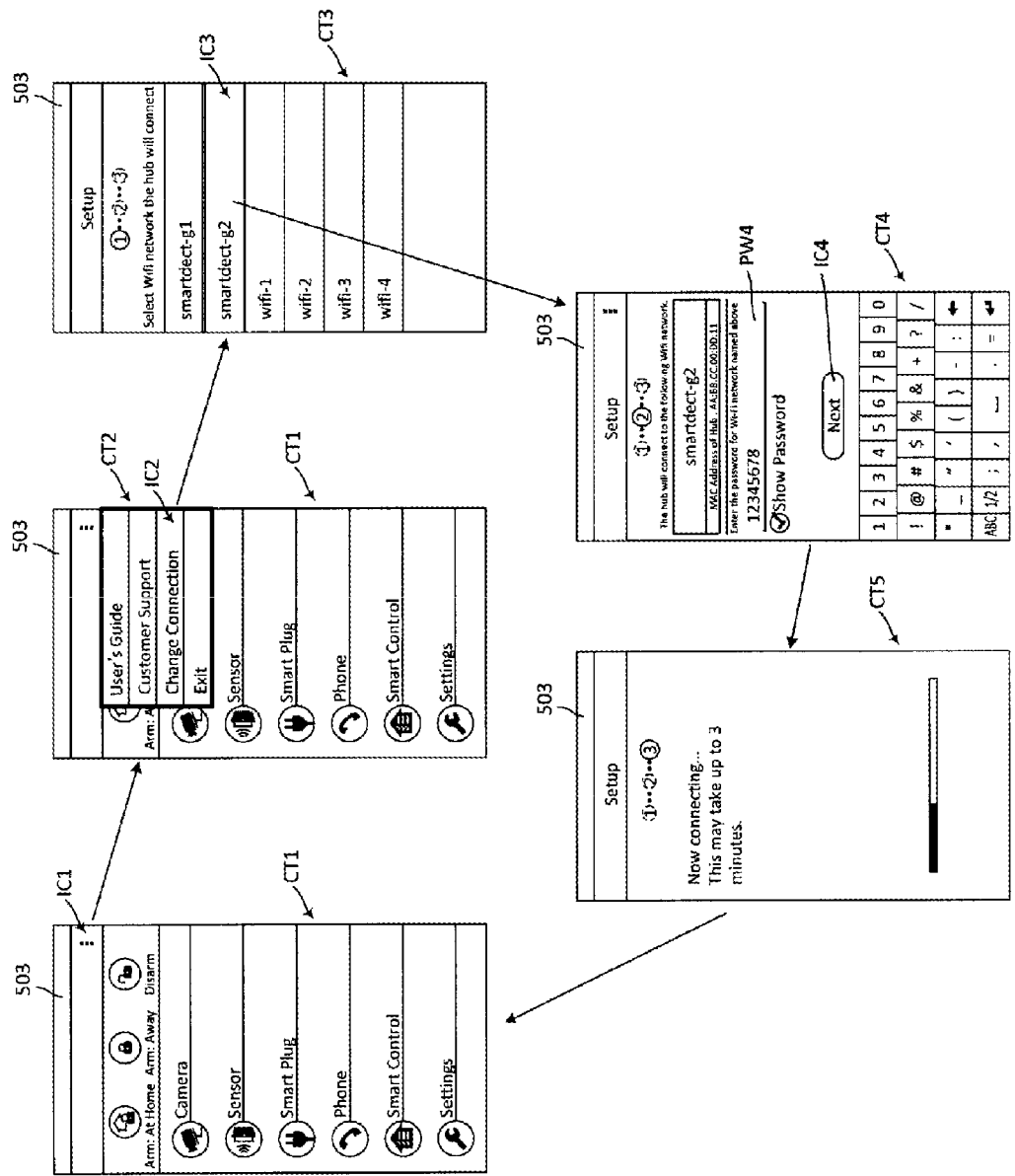
FIG. 28 is a diagram illustrating one example of a screen transition accompanied by a switching operation from the soft AP mode to the router connection mode performed for the smartphone.
Figure 29:
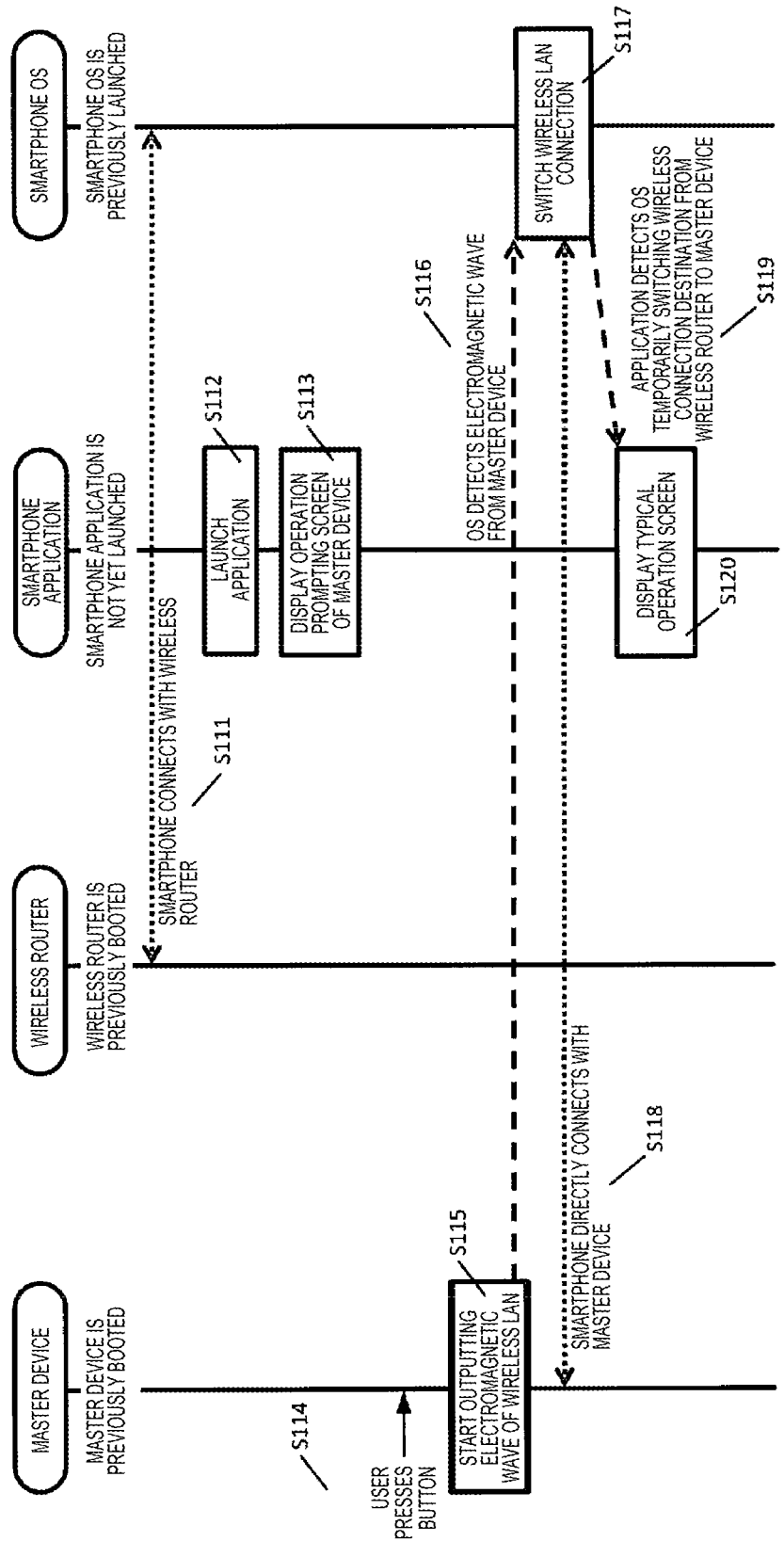
FIG. 29 is a sequence diagram illustrating operating procedures of the smartphone, the wireless router, and the master device in switching from the soft AP mode to the router connection mode in a second exemplary embodiment.
Figure 30:
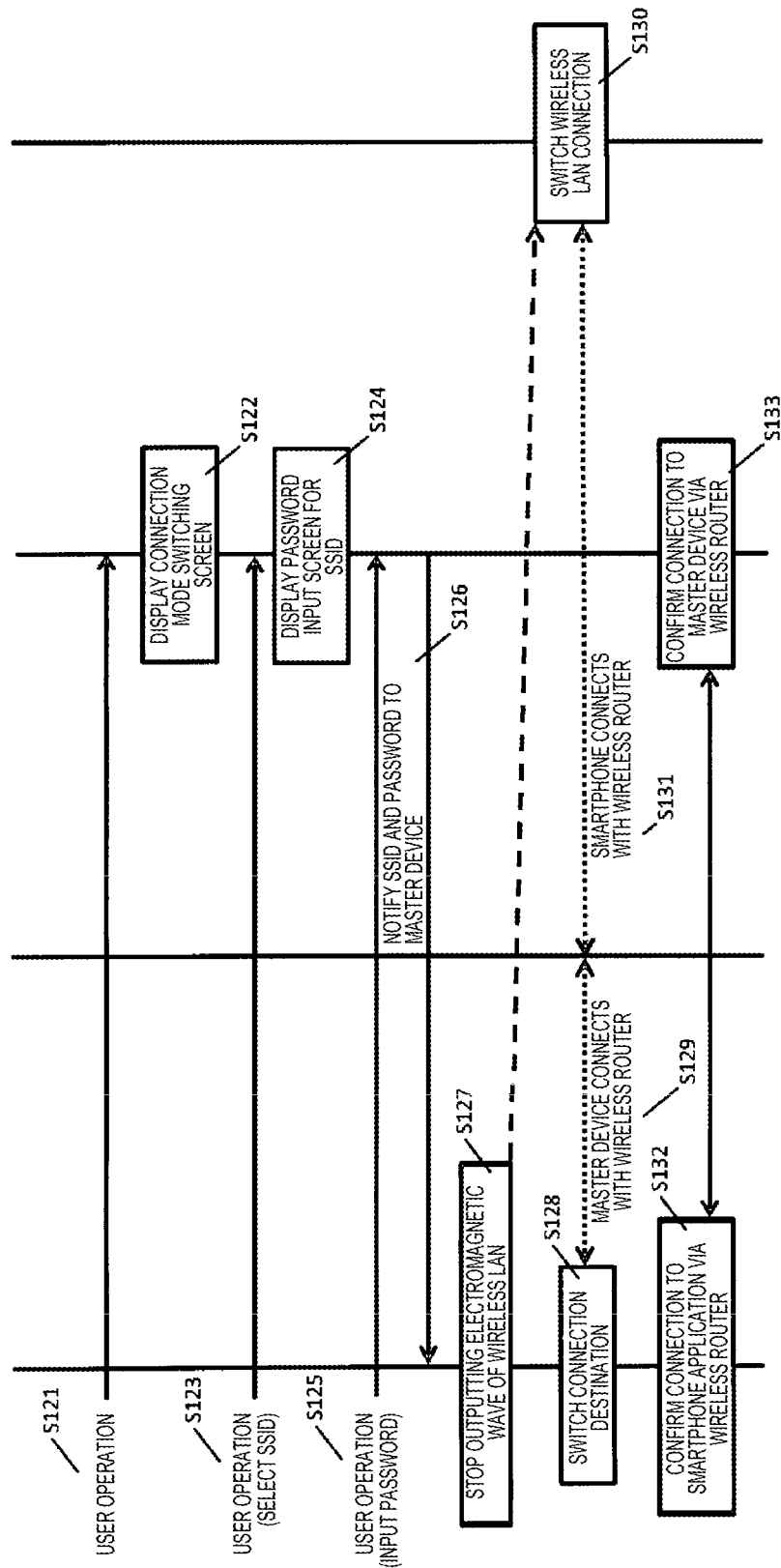
FIG. 30 is a sequence diagram illustrating operating procedures of the smartphone, the wireless router, and the master device in switching from the soft AP mode to the router connection mode in the second exemplary embodiment.

FIG. 28 is a diagram illustrating one example of a screen transition accompanied by a switching operation from the soft AP mode to the router connection mode performed for smartphone 50. FIG. 29 and FIG. 30 are sequence diagrams illustrating operating procedures of smartphone 50, wireless router 60, and master device 10 in switching from the soft AP mode to the router connection mode in the second exemplary embodiment.

As illustrated in FIG. 29, an assumption of change from the soft AP mode to the router connection mode is that master device 10, wireless router 60, and smartphone OS processor 506*a* are previously booted and that smartphone application processor 506*b* is not yet booted.

Smartphone 50 wirelessly connects with wireless router 60 (S111).

When initial setting in the soft AP mode described in the first exemplary embodiment is completed and a tap operation is performed on display/console 503 by a user operation for an icon (not illustrated) of the home network application, smartphone 50 launches the home network application (5112). Smartphone 50 displays the operation prompting screen of master device 10 on display/console 503 (S113) in order to prompt the user to output (emit) an electromagnetic wave of the wireless LAN (for example, Wifi (registered trademark)) to master device 10. The electromagnetic wave of the wireless LAN (for example, Wifi (registered trademark)) corresponds to the electromagnetic wave of the wireless network "B" in the first exemplary embodiment.

By a user operation (S114), master device 10 outputs (emits) the electromagnetic wave of the wireless LAN (for example, Wifi (registered trademark)) (S115).

Smartphone 50, when receiving the electromagnetic wave of the wireless LAN (for example, Wifi (registered trademark)) output from master device 10, detects the electromagnetic wave in smartphone OS processor 506*a* (S116). Smartphone 50, in smartphone application processor 506*b*, confirms the output of the electromagnetic wave of the wireless LAN (for example, Wifi (registered trademark)) from master device 10 based on the detection of smartphone OS processor 506*a*. Smartphone application processor 506*b* in smartphone 50 switches the connection destination of the wireless LAN from wireless router 60 in the router connection mode to master device 10 in the soft AP mode (S117).

Accordingly, master device 10 and smartphone 50 can temporarily wirelessly communicate directly with each other (S118).

Smartphone application processor 506b in smartphone 50 detects smartphone OS processor 506a switching wireless connection with wireless router 60 in Step S111 to wireless connection with master device 10 by Step S117 (S119). Smartphone application processor 506b displays typical operation screen CT1 of FIG. 28 on display/console 503 (S120).

When a tap operation is performed by a user operation on icon IC1 that is displayed in an upper right part of typical operation screen CT1 (S121), smartphone 50 displays submenu screen CT2 on display/console 503 in a superimposed manner on typical operation screen CT1 (S122).

The user performs a tap operation to select icon IC2 of "Change Connection" of submenu screen CT2 in order to change a mode of wireless connection from the soft AP mode to the router connection mode. By the tap operation, smartphone 50 displays, on display/console 503, connection mode switching screen CT3 that displays a list of SSIDs of a wireless network stored in storage 504. Smartphone 50 may display, on display/console 503, connection mode switching screen CT3 that displays a list of SSIDs of a currently connecting wireless network recognized by smartphone 50. An SSID of master device 10 to which smartphone 50 currently connects in the soft AP mode is, for example, "smartdect-g1".

When a tap operation is performed by a user operation on record IC3 "smartdect-g2", in the list of connection mode switching screen CT3, that indicates an SSID of wireless router 60 (S123), smartphone 50 displays password input screen CT4 for a password (connection password) corresponding to the SSID selected by the user operation on display/console 503 (S124). The SSID "smartdect-g2" indicates the SSID of wireless router 60 used in the router connection mode.

When "12345678" is input by a user operation in password input region PW4 of password input screen CT4 and a button "Next" is pressed (S125), smartphone 50 notifies the SSID selected by the user operation and the input password to master device 10 (S126) and displays, on display/console 503, screen CT5 that indicates that notification is being made to master device 10.

Master device 10, when receiving the SSID and the password sent from smartphone 50 in Step S126, stops outputting the electromagnetic wave that is started to be output in Step S115 (S127). Master device 10 registers, as a connection destination of wireless communication in the router connection mode, wireless router 60 that is specified by the SSID and the password and is used in the wireless LAN (for example, Wifi (registered trademark)). Accordingly, master device 10 switches the connection destination of wireless communication to wireless router 60 (S128) and thus can wirelessly connect with wireless router 60 (S129).

When master device 10 stops outputting the electromagnetic wave that is started to be output in Step S115, smartphone 50 does not receive the electromagnetic wave. Thus, smartphone 50, when not receiving the electromagnetic wave for a certain amount of time, returns the connection destination of wireless communication to wireless router 60 (S130). Accordingly, smartphone 50 can wirelessly connect with wireless router 60 (S131). Then, master device 10 can confirm wireless connection with the home network application of smartphone 50 through wireless router 60 and can wirelessly communicate with smartphone 50 (S132). Similarly, smartphone 50 can confirm wireless connection with master device 10 through wireless router 60, displays typical operation screen CT1 on display/console 503, and can wirelessly communicate with master device 10 through wireless router 60 (S133).

As described heretofore, in home interior monitoring system 5 of the present exemplary embodiment, smartphone 50 displays connection mode switching screen CT3 for a mode of wireless communication between master device 10 and smartphone 50 on display/console 503 in the case of direct wireless communication being performed between master device 10 and smartphone 50 in the soft AP mode. When an SSID used in the router connection mode is selected by a user operation performed on connection mode switching screen CT3, smartphone 50 sends router connection information including the selected SSID (specifically, the selected SSID and a password input by a user operation) to master device 10. Master device 10 uses the router connection information sent from smartphone 50 to perform registration in order to switch the connection destination of wireless communication to wireless router 60.

Accordingly, home interior monitoring system 5, in the case of, for example, the user purchasing wireless router 60 and finishing initial setting, can switch from the soft AP mode for direct connection between master device 10 and smartphone 50 to the router connection mode for connection between master device 10 and smartphone 50 through wireless router 60 for the purpose of wide use of smartphone 50, and can improve convenience of the user.

Smartphone 50, when an SSID of wireless communication is selected, displays a password input screen for a password corresponding to the selected SSID on display/console 503 and sends router connection information including a password input by a user operation to master device 10. Accordingly, change of a mode of wireless connection between master device 10 and smartphone 50 from the soft AP mode to the router connection mode can be facilitated by a simple user operation performed on smartphone 50.

While exemplary embodiments are described heretofore with reference to the drawings, apparently the present disclosure is not limited to such examples. It is apparent for those skilled in the art to perceive various modification examples or correction examples within the scope disclosed in the claims, and obviously these examples are understood to fall within the technical scope of the present disclosure.

While the above second exemplary embodiment described change of a mode of wireless communication from the soft AP mode to the router connection mode, the present disclosure does not exclude change of a mode of wireless communication from the router connection mode to the soft AP mode. Specifically, in the case of the user desiring to change a mode of wireless communication from the router connection mode to the soft AP mode, the user performs an initializing operation of setting of the mode of wireless communication on smartphone 50. Accordingly, smartphone 50 resets the content of initial setting described in the first exemplary embodiment and instructs master device 10 to reset the content of initial setting. Master device 10, when receiving a reset instruction from smartphone 50, resets the content of initial setting described in the first exemplary embodiment in the same manner. Accordingly, master device 10 and smartphone 50 can return to the state thereof at the start of initial setting. Then, initial setting may be performed of the soft AP mode so that the soft AP mode can be used.

The present disclosure is useful as a home interior monitoring system and a communication setting method that easily perform initial setting of communication between a master device and a smartphone according to a wireless connection status of the smartphone at the time of initial setting of communication between the master device and the smartphone regardless of the presence of a wireless router in wireless communication between the master device of a fixed phone and the smartphone carried by a user, and that thereby improves convenience of the user.

What is claimed is:

1. A home interior monitoring system comprising:
a master device that can wirelessly communicate with at least one electric device installed in an interior of a home; and
a mobile phone terminal that can wirelessly communicate with the master device through a wireless router and that can wirelessly communicate directly with the master device,
wherein in a case of setting information related to a connection destination of the master device in wireless communication not being registered in the master device, the mobile phone terminal, at the start of setting of the registration, determines a mode of wireless communication with the master device according to whether or not wireless communication is performed through the wireless router and acquires setting information related to the connection destination corresponding to the determined mode of wireless communication,
the mobile phone terminal sends a message indicating that wireless communication will be performed in the determined mode of wireless communication and sends the setting information related to the connection destination corresponding to the mode of wireless communication to the master device, and
the master device registers the setting information that is sent from the mobile phone terminal and related to the connection destination corresponding to the mode of wireless communication.

2. The home interior monitoring system of claim 1,
wherein the mobile phone terminal, in a case of wireless connection being made through the wireless router at the start of setting of the registration, determines the mode of wireless communication with the master device to be a router connection mode and sends router connection information of the wireless router to the master device as the setting information related to the connection destination corresponding to the router connection mode.

3. The home interior monitoring system of claim 2,
wherein the mobile phone terminal retains in advance identification information of wireless communication in the router connection mode, and
the mobile phone terminal has a display input, displays, on the display input, an input screen for a password corresponding to the identification information of wireless communication, and sends a password input by a user operation in the input screen to the master device as the router connection information.

4. The home interior monitoring system of claim 1,
wherein the mobile phone terminal, in a case of wireless connection not being made through the wireless router at the start of setting of the registration, determines the mode of wireless communication with the master device to be a direct connection mode and sends, to the master device, a message indicating that wireless communication will be performed with the mode of wireless communication as the direct connection mode.

5. The home interior monitoring system of claim 4,
wherein the master device, when receiving the message indicating that wireless communication will be performed with the mode of wireless communication as the direct connection mode, sends identification information of wireless communication in the direct connection mode to the mobile phone terminal, and
the mobile phone terminal has a display input, displays, on the display input, an input screen for a password corresponding to the identification information of wireless communication sent from the master device, and sends a password input by a user operation in the input screen to the master device as terminal connection information.

6. A communication setting method in a home interior monitoring system including a master device that can wirelessly communicate with at least one electric device installed in an interior of a home, and a mobile phone terminal that can wirelessly communicate with the master device through a wireless router and that can wirelessly communicate directly with the master device,
wherein in a case of a connection destination of the master device in wireless communication not being registered in the master device, the mobile phone terminal, at the start of setting of the registration, determines a mode of wireless communication with the master device according to whether or not wireless communication is performed through the wireless router,
the mobile phone terminal sends, to the master device, a message indicating that wireless communication will be performed in the determined mode of wireless communication,
the mobile phone terminal acquires setting information related to the connection destination corresponding to the determined mode of wireless communication and sends the setting information to the master device, and
the master device registers the setting information that is sent from the mobile phone terminal and related to the connection destination corresponding to the mode of wireless communication.

7. The communication setting method of claim 6,
wherein the mobile phone terminal, in a case of wireless connection being made through the wireless router at the start of setting of the registration, determines the mode of wireless communication with the master device to be a router connection mode and sends router connection information of the wireless router to the master device as the setting information related to the connection destination corresponding to the router connection mode.

8. The communication setting method of claim 7,
wherein the mobile phone terminal retains in advance identification information of wireless communication in the router connection mode, and
the mobile phone terminal has a display input, displays, on the display input, an input screen for a password corresponding to the identification information of wireless communication, and sends a password input by a user operation in the input screen to the master device as the router connection information.

9. The communication setting method of claim 6,
wherein the mobile phone terminal, in a case of wireless connection not being made through the wireless router at the start of setting of the registration, determines the mode of wireless communication with the master device to be a direct connection mode and sends, to the master device, a message indicating that wireless communication will be performed with the mode of wireless communication as the direct connection mode.

10. The communication setting method of claim 9, wherein the master device, when receiving the message indicating that wireless communication will be performed with the mode of wireless communication as the direct connection mode, sends identification information of wireless communication in the direct connection mode to the mobile phone terminal, and the mobile phone terminal has a display input, displays, on the display input, an input screen for a password corresponding to the identification information of wireless communication sent from the master device, and sends a password input by a user operation in the input screen to the master device as terminal connection information.

* * * * *